US012381028B2

(12) United States Patent
Hirayama et al.

(10) Patent No.: US 12,381,028 B2
(45) Date of Patent: Aug. 5, 2025

(54) LAMINATED CORE AND ELECTRICAL DEVICE

(71) Applicant: NIPPON STEEL CORPORATION, Tokyo (JP)

(72) Inventors: Ryu Hirayama, Tokyo (JP); Tesshu Murakawa, Tokyo (JP); Miho Tomita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 722 days.

(21) Appl. No.: 17/774,771

(22) PCT Filed: Nov. 13, 2020

(86) PCT No.: PCT/JP2020/042397
§ 371 (c)(1),
(2) Date: May 5, 2022

(87) PCT Pub. No.: WO2021/095837
PCT Pub. Date: May 20, 2021

(65) Prior Publication Data
US 2022/0384085 A1 Dec. 1, 2022

(30) Foreign Application Priority Data
Nov. 15, 2019 (JP) ................................ 2019-206674

(51) Int. Cl.
*H01F 27/245* (2006.01)
*H01F 1/147* (2006.01)
*H01F 41/02* (2006.01)

(52) U.S. Cl.
CPC .......... *H01F 27/245* (2013.01); *H01F 1/147* (2013.01); *H01F 41/0233* (2013.01)

(58) Field of Classification Search
CPC .............................. H01F 27/245; H01F 1/147
(Continued)

(56) References Cited

U.S. PATENT DOCUMENTS 4,331,196 A * 5/1982 Ohashi ................ C21D 8/1205 164/476
2013/0309525 A1 11/2013 Fujikura et al.
(Continued)

FOREIGN PATENT DOCUMENTS

JP 07207343 A * 8/1995 ......... H01F 1/14775
JP 2001-231191 A 8/2001
(Continued)

*Primary Examiner* — Shawki S Ismail
*Assistant Examiner* — Joselito S. Baisa
(74) *Attorney, Agent, or Firm* — Birch, Stewart, Kolasch & Birch, LLP

(57) ABSTRACT

A laminated core (100) has a plurality of legs having an extension direction in a direction perpendicular to a lamination direction of electrical steel sheets and a plurality of yokes having an extension direction in a direction orthogonal to the lamination direction of the electrical steel sheets and the extension direction of the legs, and, in the same position of the electrical steel sheet in the lamination direction, at least a partial region of the legs and at least a partial region of the yokes are configured by the same electrical steel sheet. The electrical steel sheet is disposed such that a first direction of directions of easy magnetization of the electrical steel sheet is along the extension direction of the legs and a second direction of the directions of easy magnetization of the electrical steel sheet is along the extension direction of the yokes.

7 Claims, 12 Drawing Sheets

(58) Field of Classification Search
USPC .................................................. 336/221, 234
See application file for complete search history.

(56) References Cited

U.S. PATENT DOCUMENTS

| | | | | |
|---|---|---|---|---|
| 2017/0342519 | A1 | 11/2017 | Uesaka et al. | |
| 2018/0355454 | A1* | 12/2018 | Okubo | C21D 6/008 |
| 2019/0330708 | A1* | 10/2019 | Okubo | C22C 38/60 |
| 2023/0113209 | A1* | 4/2023 | Tanaka | C21D 6/008 |

FOREIGN PATENT DOCUMENTS

| | | | | |
|---|---|---|---|---|
| JP | 2004-332042 | A | | 11/2004 |
| JP | 2005186112 | A | * | 7/2005 |
| JP | 2011-111658 | A | | 6/2011 |
| JP | 2016-127092 | A | | 7/2016 |
| JP | 2019163509 | A | * | 9/2019 |
| JP | 2019-178380 | A | | 10/2019 |
| WO | WO 2013/024899 | A1 | | 2/2013 |

* cited by examiner

LAMINATED CORE AND ELECTRICAL DEVICE

TECHNICAL FIELD OF THE INVENTION

The present invention relates to a laminated core and an electrical device.

Priority is claimed on Japanese Patent Application No. 2019-206674, filed in Japan on Nov. 15, 2019, the content of which is incorporated herein by reference.

RELATED ART

In electrical devices such as single-phase transformers, cores (iron cores) are used. As such cores, there are laminated cores such as an EI core, an EE core, and a UI core. In such a laminated core, directions in which the main magnetic flux flows are two directions orthogonal to each other.

When an electrical steel sheet that configures such a laminated core is a grain-oriented electrical steel sheet, the above-described two directions are matched to a direction of a magnetic easy axis (a direction at an angle of 0° with respect to a rolling direction) and a direction of a magnetic difficult axis (a direction at an angle of 90° with respect to the rolling direction). The grain-oriented electrical steel sheet has favorable magnetic characteristics in the direction of the magnetic easy axis. However, compared with the magnetic characteristics in the direction of the magnetic easy axis, the magnetic characteristics in the direction of the magnetic difficult axis significantly deteriorate. Therefore, the iron loss of the entire core increases or the like, which makes the performance of the core deteriorate.

Therefore, Patent Document 1 discloses that an EI core of a small transformer is configured using a non-oriented electrical steel sheet for which the average grain size after hot-rolled sheet annealing is set to 300 μm or more, cold rolling is performed at a rolling reduction of 85% or larger and 95% or smaller, and finish annealing is performed at 700° C. or higher and 950° C. or lower for 10 seconds or longer and 1 minutes or shorter. In this non-oriented electrical steel sheet, the magnetic characteristics are excellent in the directions at angles of 0° and 90° with respect to the rolling direction.

PRIOR ART DOCUMENT

Patent Document

[Patent Document 1] Japanese Unexamined Patent Application, First Publication No. 2004-332042

DISCLOSURE OF THE INVENTION

Problems to be Solved by the Invention

However, in Patent Document 1, no specific studies are made regarding a case where a non-oriented electrical steel sheet is applied to an electrical device such as a small transformer. Therefore, there is room for improvement in magnetic characteristics in conventional laminated cores.

The present invention has been made in view of the above-described problem, and an object of the present invention is to improve the magnetic characteristics of laminated cores.

Means for Solving the Problem

In order to solve the above-described problems, the present invention employs the following configurations.

(1) A laminated core according to an aspect of the present invention is a laminated core having a plurality of electrical steel sheets laminated such that sheet surfaces face each other, in which each of the plurality of electrical steel sheets includes a plurality of legs and a plurality of yokes that are disposed in a direction perpendicular to an extension direction of the legs as an extension direction such that a closed magnetic circuit is formed in the laminated core when the laminated core is excited, a lamination direction of the electrical steel sheet that configures the plurality of legs and a lamination direction of the electrical steel sheet that configures the plurality of yokes are the same as each other, the electrical steel sheet has a chemical composition containing, by mass %, C: 0.0100% or less, Si: 1.50% to 4.00%, sol. Al: 0.0001% to 1.0%, S: 0.0100% or less, N: 0.0100% or less, one or more selected from the group consisting of Mn, Ni, Co, Pt, Pb, Cu, and Au: 2.50% to 5.00% in total, Sn: 0.000% to 0.400%, Sb: 0.000% to 0.400%, P: 0.000% to 0.400%, and one or more selected from the group consisting of Mg, Ca, Sr, Ba, Ce, La, Nd, Pr, Zn, and Cd: 0.0000% to 0.0100% in total, in which, when the Mn content (mass %) is indicated by [Mn], the Ni content (mass %) is indicated by [Ni], the Co content (mass %) is indicated by [Co], the Pt content (mass %) is indicated by [Pt], the Pb content (mass %) is indicated by [Pb], the Cu content (mass %) is indicated by [Cu], the Au content (mass %) is indicated by [Au], the Si content (mass %) is indicated by [Si], and the sol. Al content (mass %) is indicated by [sol. Al], Formula (A) below is satisfied, and a remainder includes Fe and impurities, when B50 in a rolling direction is indicated by B50L, B50 in a direction at an angle of 90° from the rolling direction is indicated by B50C, and, between B50 in two directions in which a smaller angle of angles with respect to the rolling direction is 45°, B50 in one direction is indicated by B50D1, and B50 in the other direction is indicated by B50D2, Formula (B) and Formula (C) below are satisfied, an X-ray random intensity ratio in {100}<011> is 5 or more and less than 30, and a sheet thickness is 0.50 mm or less, the electrical steel sheet is disposed such that any direction of two directions in which the smaller angle of the angles with respect to the rolling direction becomes 45° is along any of the extension direction of the legs and the extension direction of the yokes, and the two directions in which the magnetic characteristics are most excellent are the two directions in which the smaller angle of the angles with respect to the rolling direction is 45°.

$$([Mn]+[Ni]+[Co]+[Pt]+[Pb]+[Cu]+[Au])-([Si]+[sol.Al])>0\% \cdots \quad (A)$$

$$(B50D1+B50D2)/2>1.7T \cdots \quad (B)$$

$$(B50D1+B50D2)/2>(B50L+B50C)/2 \cdots \quad (C)$$

Here, the magnetic flux density B50 refers to a magnetic flux density when excited with a magnetic field strength of 5000 A/m.

(2) The laminated core according to (1) above, in which Formula (D) below may be satisfied.

$$(B50D1+B50D2)/2>1.1\times(B50L+B50C)/2 \cdots \quad (D)$$

(3) The laminated core according to (1) above, in which Formula (E) below may be satisfied.

$$(B50D1+B50D2)/2>1.2\times(B50L+B50C)/2 \cdots \quad (E)$$

(4) The laminated core according to (1) above, in which Formula (F) below may be satisfied.

$$(B50D1+B50D2)/2>1.8T \cdots \quad (F)$$

(5) The laminated core according to (1) above may be an EI core, an EE core, a UI core, or a UU core.

(6) An electrical device according to one aspect of the present invention has the laminated core according to any one of (1) to (5) above and a coil that is disposed so as to surround the laminated core.

Effects of the Invention

According to the above-described aspects of the present invention, it is possible to improve the magnetic characteristics of laminated cores.

Figure 1:
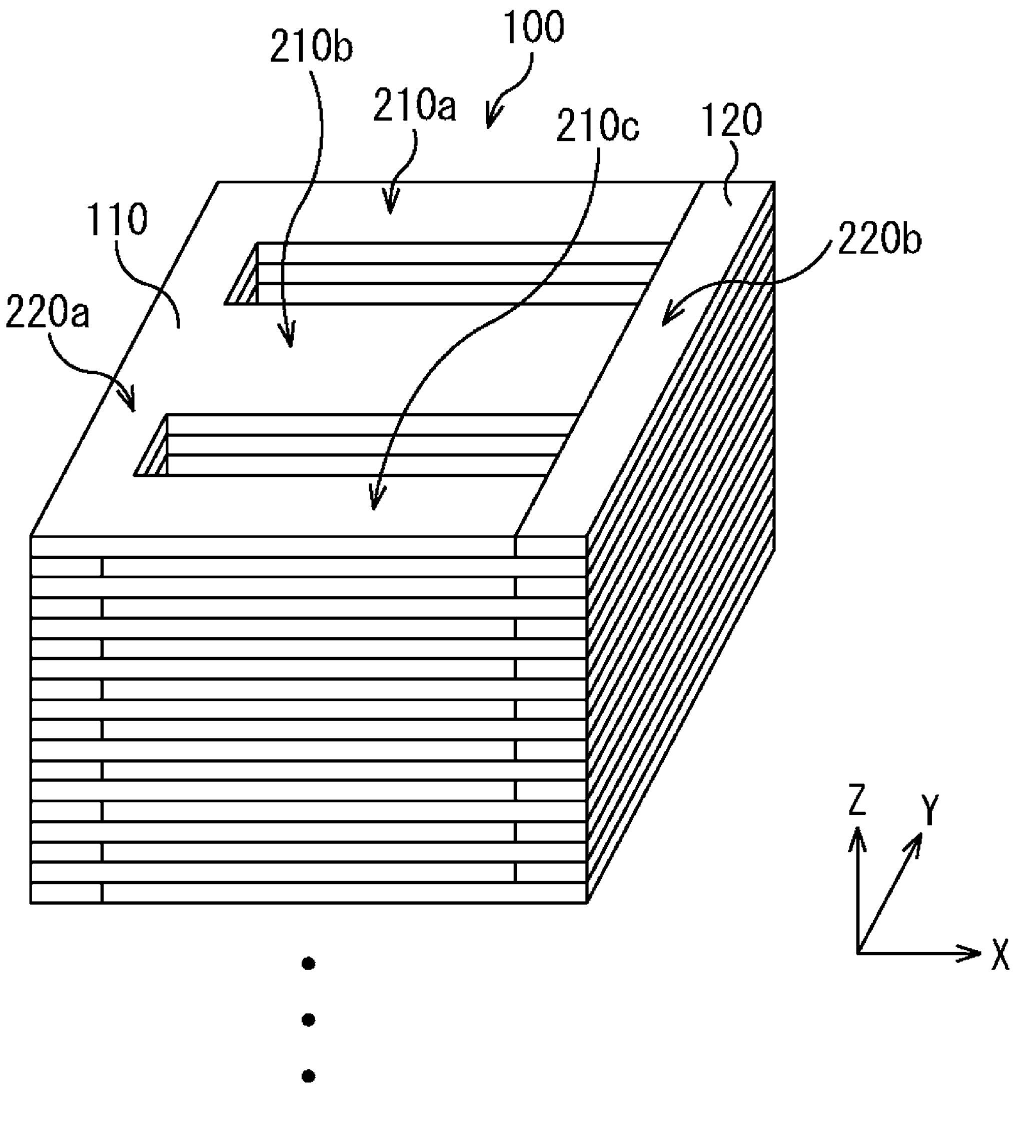
FIG. 1 is a view showing a first example of an external appearance configuration of a laminated core.

EMBODIMENTS OF THE INVENTION (Electrical Steel Sheet Used for Laminated Core)

First, an electrical steel sheet that is used for a laminated core of an embodiment to be described below will be described.

First, the chemical composition of steel that is used in a non-oriented electrical steel sheet that is an example of the electrical steel sheet that is used for the laminated core and a manufacturing method therefor will be described. In the following description, "%" that is the unit of the amount of each element that is contained in the non-oriented electrical steel sheet or the steel material means "mass %" unless particularly otherwise described. In addition, numerical limiting ranges described below using "to" include the lower limit value and the upper limit value in the ranges. Numerical values expressed with 'more than' or 'less than' are not included in numerical ranges. The non-oriented electrical steel sheet that is an example of the electrical steel sheet or the steel material that is used for the laminated core and the steel have a chemical composition in which ferrite-austenite transformation (hereinafter, α-γ transformation) can occur, C: 0.0100% or less, Si: 1.50% to 4.00%, sol. Al: 0.0001% to 1.0%, S: 0.0100% or less, N: 0.0100% or less, one or more selected from the group consisting of Mn, Ni, Co, Pt, Pb, Cu, and Au: 2.50% to 5.00% in total, Sn: 0.000% to 0.400%, Sb: 0.000% to 0.400%, P: 0.000% to 0.400%, and one or more selected from the group consisting of Mg, Ca, Sr, Ba, Ce, La, Nd, Pr, Zn, and Cd: 0.0000% to 0.0100% in total are contained, and the remainder includes Fe and impurities. Furthermore, the amounts of Mn, Ni, Co, Pt, Pb, Cu, Au, Si, and sol. Al satisfy predetermined conditions to be described below. Examples of the impurities are impurities that are contained in a raw material such as ore or a scrap or impurities that are contained during manufacturing steps.

<<C: 0.0100% or Less>>

C increases the iron loss or causes magnetic ageing. Therefore, the C content is preferably as small as possible. Such a phenomenon becomes significant when the C content exceeds 0.0100%. Therefore, the C content is set to 0.0100% or less. A reduction in the C content also contributes to uniform improvement in the magnetic characteristics in all directions in the sheet surface. The lower limit of the C content is not particularly limited, but is preferably set to 0.0005% or more based on the cost of a decarburization treatment at the time of refining.

<<Si: 1.50% to 4.00%>>

Si increases the electric resistance to decrease the eddy-current loss to reduce the iron loss or increases the yield ratio to improve blanking workability on iron cores. When the Si content is less than 1.50%, these action effects cannot be sufficiently obtained. Therefore, the Si content is set to 1.50% or more. On the other hand, when the Si content is more than 4.00%, the magnetic flux density decreases, the blanking workability deteriorates due to an excessive increase in hardness, or cold rolling becomes difficult. Therefore, the Si content is set to 4.00% or less.

<<Sol. Al: 0.0001% to 1.0%>>

Sol. Al increases the electric resistance to decrease the eddy-current loss to reduce the iron loss. Sol. Al also contributes to improvement in the relative magnitude of a magnetic flux density B50 with respect to the saturated magnetic flux density. Here, the magnetic flux density B50 refers to a magnetic flux density when excited with a magnetic field strength of 5000 A/m. When the sol. Al content is less than 0.0001%, these action effects cannot be sufficiently obtained. In addition, Al also has a desulfurization-accelerating effect in steelmaking. Therefore, the sol. Al content is set to 0.0001% or more. On the other hand, when the sol. Al content is more than 1.0%, the magnetic flux density decreases or the yield ratio is decreased to degrade the blanking workability. Therefore, the sol. Al content is set to 1.0% or less.

<<S: 0.0100% or Less>>

S is not an essential element and is contained in steel, for example, as an impurity. S causes the precipitation of fine MnS and thereby impairs recrystallization and the growth of crystal grains in annealing. Therefore, the S content is preferably as small as possible. An increase in the iron loss and a decrease in the magnetic flux density resulting from such impairing of recrystallization and crystal grain growth become significant when the S content is more than 0.0100%. Therefore, the S content is set to 0.0100% or less. The lower limit of the S content is not particularly limited, but is preferably set to 0.0003% or more based on the cost of a desulfurization treatment at the time of refining.

<<N: 0.0100% or Less>>

Similar to C, N degrades the magnetic characteristics, and thus the N content is preferably as small as possible. Therefore, the N content is set to 0.0100% or less. The lower limit of the N content is not particularly limited, but is preferably set to 0.0010% or more based on the cost of a denitrification treatment at the time of refining.

<<One or More Selected from the Group Consisting of Mn, Ni, Co, Pt, Pb, Cu, and Au: 2.50% to 5.00% in Total>>

Since these elements are necessary elements for causing α-γ transformation, these elements need to be contained in total of 2.50% or more. On the other hand, when the total exceeds 5.00%, there is a case where the cost increases and the magnetic flux density decreases. Therefore, the total of these elements is set to 5.00% or less.

In addition, as a condition for enabling the occurrence of the α-γ transformation, the chemical composition is made to further satisfy the following condition. That is, when the Mn content (mass %) is indicated by [Mn], the Ni content (mass %) is indicated by [Ni], the Co content (mass %) is indicated by [Co], the Pt content (mass %) is indicated by [Pt], the Pb content (mass %) is indicated by [Pb], the Cu content (mass %) is indicated by [Cu], the Au content (mass %) is indicated by [Au], the Si content (mass %) is indicated by [Si], and the sol. Al content (mass %) is indicated by [sol. Al], by mass %, Formula (1) below is preferably satisfied.

$$([Mn]+[Ni]+[Co]+[Pt]+[Pb]+[Cu]+[Au])-([Si]+[sol.Al])>0\% \quad (1)$$

In a case where Formula (1) is not satisfied, since α-γ transformation does not occur, the magnetic flux density decreases.

<<Sn: 0.000% to 0.400%, Sb: 0.000% to 0.400%, and P: 0.000% to 0.400%>>

Sn or Sb improves the texture after cold rolling or recrystallization to improve the magnetic flux density. Therefore, these elements may be contained as necessary; however, when excessively contained, steel is embrittled. Therefore, the Sn content and the Sb content are both set to 0.400% or less. In addition, P may be contained to ensure the hardness of the steel sheet after recrystallization; however, when excessively contained, the embrittlement of steel is caused. Therefore, the P content is set to 0.400% or less. In the case of imparting an additional effect on the magnetic characteristics or the like as described above, one or more selected from the group consisting of 0.020% to 0.400% of Sn, 0.020% to 0.400% of Sb, and 0.020% to 0.400% of P is preferably contained.

<<One or More Selected from the Group Consisting of Mg, Ca, Sr, Ba, Ce, La, Nd, Pr, Zn, and Cd: 0.0000% to 0.0100% in Total>>

Mg, Ca, Sr, Ba, Ce, La, Nd, Pr, Zn, and Cd react with S in molten steel during the casting of the molten steel to generate the precipitate of a sulfide, an oxysulfide, or both. Hereinafter, Mg, Ca, Sr, Ba, Ce, La, Nd, Pr, Zn, and Cd will be collectively referred to as "coarse precipitate forming element" in some cases. The grain sizes in the precipitate of the coarse precipitate forming element are approximately 1 μm to 2 μm, which is significantly larger than the grain sizes (approximately 100 nm) in the fine precipitates of MnS, TiN, AlN, or the like. Therefore, these fine precipitates adhere to the precipitate of the coarse precipitate forming element and are less likely to impair recrystallization and the growth of crystal grains in annealing such as process annealing. In order to sufficiently obtain this action effect, the total of these elements is preferably 0.0005% or more. However, when the total of these elements exceeds 0.0100%, the total amount of the sulfide, the oxysulfide, or both becomes excessive, and recrystallization and the growth of crystal grains in process annealing are impaired. Therefore, the amount of the coarse precipitate forming element is set to 0.0100% or less in total.

<<Texture>>

Next, the texture of the non-oriented electrical steel sheet that is an example of the electrical steel sheet that is used for the laminated core will be described. The details of a manufacturing method will be described below, but the non-oriented electrical steel sheet that is an example of the electrical steel sheet that is used for the laminated core is a chemical composition in which α-γ transformation can occur and becomes a structure in which {100} crystal grains have grown by the refinement of the structure by rapid cooling immediately after finish rolling in hot rolling. Therefore, in the non-oriented electrical steel sheet that is an example of the electrical steel sheet that is used for the laminated core, the intensity in a {100}<011> orientation becomes 5 to 30, and the magnetic flux density B50 in a 45° direction with respect to a rolling direction becomes particularly high. As described above, the magnetic flux density becomes high in a specific direction, but a high magnetic flux density can be obtained in all directions on average as a whole. When the intensity in the {100}<011> orientation becomes less than 5, the intensity in a {111}<112> orientation, which decreases the magnetic flux density, becomes high, and the magnetic flux density decreases as a whole. In addition, in a manufacturing method in which the intensity in the {100}<011> orientation exceeds 30, it is necessary to thicken a hot-rolled sheet, which creates a problem of the manufacturing becoming difficult.

The intensity in the {100}<011> orientation can be measured by an X-ray diffraction method or an electron backscatter diffraction (EBSD) method. Since the reflection angles or the like of X-rays and electron beams from samples differ depending on crystal orientations, crystal orientation strengths can be obtained from the reflection strength or the like based on a random orientation sample. The intensity in the {100}<011> orientation of the non-oriented electrical steel sheet that is preferable as an example of the electrical steel sheet that is used for the laminated core becomes 5 to 30 in terms of the X-ray random intensity ratio. At this time, the crystal orientations may be measured by EBSD, and values converted to X-ray random intensity ratios may be used.

<<Thickness>>

Next, the thickness of the non-oriented electrical steel sheet that is an example of the electrical steel sheet that is used for the laminated core will be described. The thickness of the non-oriented electrical steel sheet that is an example of the electrical steel sheet that is used for the laminated core is 0.50 mm or less. When the thickness exceeds 0.50 mm, it is not possible to obtain an excellent high-frequency iron loss. Therefore, the thickness is set to 0.50 mm or less.

<<Magnetic Characteristics>>

Next, the magnetic characteristics of the non-oriented electrical steel sheet that is an example of the electrical steel sheet that is used for the laminated core will be described. At the time of investigating the magnetic characteristics, the value of B50, which is the magnetic flux density of the non-oriented electrical steel sheet that is an example of the electrical steel sheet that is used for the laminated core, is measured. In the manufactured non-oriented electrical steel sheet, one rolling direction and the other rolling direction cannot be distinguished. Therefore, in the present embodiment, the rolling direction refers to both the one rolling direction and the other rolling direction. When the value of B50 (T) in the rolling direction is indicated by B50L, the value of B50 (T) in a direction inclined by 45° from the rolling direction is indicated by B50D1, the value of B50 (T) in a direction inclined by 90° from the rolling direction is indicated by B50C, and the value of B50 (T) in a direction inclined by 135° from the rolling direction is indicated by B50D2, an anisotropy of the magnetic flux density in which B50D1 and B50D2 are the highest and B50L and B50C are the lowest is observed. (T) indicates the unit of the magnetic flux density (tesla).

Here, in the case of considering, for example, an all-direction (0° to 360°) distribution of the magnetic flux density for which the clockwise (which may be counter-clockwise) direction is regarded as a positive direction, when the rolling direction is set to 0° (one direction) and 180° (the other direction), B50D1 becomes the B50 values at 45° and 225°, and B50D2 becomes the B50 values at 135° and 315°. Similarly, B50L becomes the B50 values at 0° and 180°, and B50C becomes the B50 values at 90° and 270°. The B50 value at 45° and the B50 value at 225° strictly coincide with each other, and the B50 value at 135° and the B50 value at 315° strictly coincide with each other. However, since there is a case where it is not easy to make the magnetic characteristics the same at the time of actual manufacturing, there is a case where B50D1 and B50D2 do not strictly coincide with each other. Similarly, there is a case where the B50 value at 0° and the B50 value at 180° strictly coincide with each other, and the B50 value at 90° and the B50 value at 270° strictly coincide with each other, but B50L and B50C do not strictly coincide with each other. In the non-oriented electrical steel sheet that is an example of the electrical steel sheet that is used for the laminated core, Formula (2) and Formula (3) below are satisfied using the average value of B50D1 and B50D2 and the average value of B50L and B50C.

$$(B50D1+B50D2)/2>1.7T \quad (2)$$

$$(B50D1+B50D2)/2>(B50L+B50C)/2 \quad (3)$$

When the magnetic flux density is measured as described above, the average value of B50D1 and B50D2 becomes 1.7T or more as in Formula (2), and a high anisotropy of the magnetic flux density as in Formula (3) is confirmed.

Furthermore, in addition to satisfying Formula (1), the anisotropy of the magnetic flux density is preferably higher than in Formula (3) as shown in Formula (4) below.

$$(B50D1+B50D2)/2>1.1\times(B50L+B50C)/2 \quad (4)$$

Furthermore, the anisotropy of the magnetic flux density is preferably higher as shown in Formula (5) below.

$$(B50D1+B50D2)/2>1.2\times(B50L+B50C)/2 \quad (5)$$

Furthermore, the average value of B50D1 and B50D2 preferably becomes 1.8T or more as shown in Formula (6) below.

$$(B50D1+B50D2)/2>1.8T \quad (6)$$

The above-described 45° is a theoretical value, and there is a case where it is not easy to match the rolling direction to 45° in actual manufacturing. Therefore, rolling directions that are not strictly matched to 45° are also regarded as the rolling direction at 45°. This is also true for the 0°, 90°, 135°, 180°, 225°, 270°, and 315°.

The magnetic flux density can be measured from 55 mm×55 mm samples cut out in directions at angles of 45°, 0°, and the like with respect to the rolling direction using a single-sheet magnetic measuring instrument.

<<Manufacturing Method>>

Next, an example of a manufacturing method for the non-oriented electrical steel sheet that is an example of the electrical steel sheet that is used for the laminated core will be described. At the time of manufacturing the non-oriented electrical steel sheet that is an example of the electrical steel sheet that is used for the laminated core, for example, hot rolling, cold rolling (first cold rolling), process annealing (first annealing), skin pass rolling (second cold rolling), finish annealing (third annealing), stress relief annealing (second annealing), and the like are performed.

First, the above-described steel is heated and hot-rolled. The steel is, for example, a slab that is manufactured by normal continuous casting. Rough rolling and finish rolling of the hot rolling are performed at temperatures in the γ range (Ar1 temperature or higher). That is, hot rolling is performed such that the finishing temperature of the finish rolling becomes the Ar1 temperature or higher, and the coiling temperature becomes higher than 250° C. and 600° C. or lower. Therefore, the steel transforms from austenite to ferrite by subsequent cooling, whereby the structure is refined. When subsequent cold rolling is performed in a state where the structure has been refined, bulging recrystallization (hereinafter, bulging) is likely to occur, and it is possible to facilitate the {100} crystal grains, which are, normally, difficult to grow.

In addition, at the time of manufacturing the non-oriented electrical steel sheet that is an example of the electrical steel sheet that is used for the laminated core, furthermore, a temperature (finishing temperature) when the steel passes through the final pass of finish rolling is set to the Ar1 temperature or higher, and the coiling temperature is set to higher than 250° C. and 600° C. or lower. The steel transforms from austenite to ferrite, whereby the crystal structure is refined. The crystal structure is refined as described above, whereby it is possible to facilitate the occurrence of bulging through the subsequent cold rolling and process annealing.

After that, the hot-rolled steel sheet is coiled and pickled without being annealed, and the hot-rolling steel sheet is cold-rolled. In the cold rolling, the rolling reduction is preferably set to 80% to 95%. At a rolling reduction of smaller than 80%, bulging is less likely to occur. At a rolling reduction of larger than 95%, it becomes easier for the {100} crystal grains to grow by subsequent bulging, but it is necessary to thicken the hot-rolled steel sheet, the coiling of the hot-rolled steel sheet becomes difficult, and operations are likely to become difficult. The rolling reduction of the cold rolling is more preferably 86% or larger. At a rolling reduction of the cold rolling of 86% or larger, bulging is less likely to occur.

When the cold rolling ends, subsequently, process annealing is performed. At the time of manufacturing the non-oriented electrical steel sheet that is an example of the electrical steel sheet that is used for the laminated core, process annealing is performed at a temperature at which the steel does not transform into austenite. That is, the temperature in the process annealing is preferably set to lower than the Ac1 temperature. When the process annealing is performed as described above, bulging occurs, and it becomes easy for the {100} crystal grains to grow. In addition, the time of the process annealing is preferably set to 5 seconds to 60 seconds.

When the process annealing ends, next, skin pass rolling is performed. When skin pass rolling and annealing are performed in a state where bulging has occurred as described above, the {100} crystal grains further grow from a portion where the bulging has occurred as a starting point. This is because the skin pass rolling makes it difficult for strains to be accumulated in the {100}<011> crystal grains and makes it easy for strains to be accumulated in the {111}<112> crystal grains, and, in the subsequent annealing, the {100}<011> crystal grains including a small number of strains intrude into the {111}<112> crystal grains using the difference in strains as a driving force. This intrusion phenomenon that is caused by the strain difference as the driving force is called strain-induced boundary migration (hereinafter, SIBM). The rolling reduction of skin pass rolling is preferably 5% to 25%. At a rolling reduction of smaller than 5%, since the strain amount is too small, SIBM does not occur in the subsequent annealing, and the {100}<011> crystal grains do not become large. On the other hand, at a rolling reduction of larger than 25%, the strain amount becomes too large, and recrystallization nucleation (hereinafter, nucleation) in which new crystal grains are formed in the {111}<112> crystal grains occurs. In this nucleation, since almost all grains that are newly formed are {111}<112> crystal grain, the magnetic characteristics become poor.

After the skin pass rolling, final annealing is performed to release strains and improve the workability. Similarly, the final annealing is also set to a temperature at which the steel does not transform into austenite, and the temperature of the final annealing is set to lower than the Ac1 temperature. When the final annealing is performed as described above, the {100}<011> crystal grains intrude the {111}<112> crystal grains, and the magnetic characteristics can be improved. In addition, at the time of the final annealing, a time taken for the temperature to reach 600° C. to the Ac1 temperature is set to 1200 seconds or shorter. When this annealing time is too short, almost all strains created by the skin pass remain, and the steel sheet warps when blanked into a complicated shape. On the other hand, when the annealing time is too long, crystal grains become too coarse, the droop surface becomes large at the time of blanking, and the blanking accuracy becomes poor.

When the finish annealing ends, the non-oriented electrical steel sheet is formed or the like in order to produce a desired steel member. In addition, in order to remove strains or the like formed by forming or the like (for example, blanking) performed on the steel member made of the non-oriented electrical steel sheet, stress relief annealing is performed on the steel member. In the present embodiment, in order to cause SIBM at lower than the Ac1 temperature and to coarsen crystal grain sizes, the temperature of the stress relief annealing is set to, for example, approximately 800° C., and the time of the stress relief annealing is set to approximately two hours. The stress relief annealing makes it possible to improve the magnetic characteristics.

In the non-oriented electrical steel sheet (steel member) that is an example of the electrical steel sheet that is used for the laminated core, the high B50 of Formula (1) and the excellent anisotropy of Formula (2) can be obtained mainly by the finish rolling that is performed at the Ar1 temperature or higher in the hot rolling step in the above-described manufacturing method. Furthermore, the rolling reduction in the cold rolling step is set to approximately 85%, whereby Formula (3) can be obtained, and, the rolling reduction in the skin pass rolling step is set to approximately 10%, whereby a more excellent anisotropy of Formula (4) can be obtained.

The Ail temperature in the present embodiment is obtained from a thermal expansion change of the steel (steel sheet) in the middle of cooling at an average cooling rate of 1° C./second. In addition, the Ac1 temperature in the present embodiment is obtained from a thermal expansion change of the steel (steel sheet) in the middle of heating at an average heating rate of 1° C./second.

The steel member made of the non-oriented electrical steel sheet that is an example of the electrical steel sheet that is used for the laminated core can be manufactured as described above.

Next, the non-oriented electrical steel sheet that is an example of the electrical steel sheet that is used for the laminated core will be specifically described while describing examples. The examples to be described below are simply examples of the non-oriented electrical steel sheet, and the non-oriented electrical steel sheet is not limited to the following examples.

First Example

Molten steel was cast, thereby producing ingots having components shown in Table 1 and Table 2 below. Here, the column "left side of formula" indicates the value of the left side of Formula (1) described above. After that, the produced ingots were hot-rolled by being heated up to 1150° C. and rolled such that the sheet thicknesses became 2.5 mm. In addition, after the end of finish rolling, the hot-rolled steel sheets were coiled. The temperatures (finishing temperatures) in a stage of the final pass of the finish rolling at this time were 830° C. and were all temperatures higher than the Ar1 temperature. For No. 108 where no γ-α transformation occurred, the finishing temperature was set to 850° C. In addition, regarding the coiling temperature, the hot-rolled steel sheets were coiled under the conditions shown in Table 1.

Next, the hot-rolled steel sheets were pickled to remove scales and cold-rolled in rolling reductions after the cold rolling shown in Table 1. In addition, process annealing was performed at 700° C. for 30 seconds in a non-oxidizing atmosphere. Next, rolling was performed in rolling reductions of the second cold rolling (skin pass rolling) shown in Table 1.

Next, in order to investigate the magnetic characteristics, after the second cold rolling (skin pass rolling), final annealing was performed at 800° C. for 30 seconds to produce 55 mm×55 mm samples by shearing, then, stress relief annealing was performed at 800° C. for two hours, and the magnetic flux densities B50 were measured. As the measurement samples, 55 mm×55 mm samples were collected in two directions at angles of 0° C. and 45° C. with respect to the rolling direction. In addition, these two types of samples were measured, and the magnetic flux densities B50 at 0°, 45°, 90°, and 135° with respect to the rolling direction were each regarded as B50L, B50D1, B50C, and B50D2.

TABLE 1

| No. | Component (wt %) C | Si | sol-Al | S | N | Mn | Ni | Co | Pt | Pb | Cu |
|---|---|---|---|---|---|---|---|---|---|---|---|
| 101 | 0.0008 | 2.52 | 0.010 | 0.0017 | 0.0019 | 3.12 | — | — | — | — | — |
| 102 | 0.0006 | 2.51 | 0.013 | 0.0017 | 0.0024 | — | 3.14 | — | — | — | — |
| 103 | 0.0007 | 2.48 | 0.013 | 0.0023 | 0.0017 | — | — | 3.07 | — | — | — |
| 104 | 0.0009 | 2.48 | 0.010 | 0.0023 | 0.0017 | — | — | — | 3.06 | — | — |
| 105 | 0.0008 | 2.48 | 0.010 | 0.0017 | 0.0017 | — | — | — | — | 3.12 | — |
| 106 | 0.0007 | 2.53 | 0.009 | 0.0020 | 0.0017 | — | — | — | — | — | 3.13 |
| 107 | 0.0012 | 2.47 | 0.009 | 0.0019 | 0.0022 | — | — | — | — | — | — |
| 108 | 0.0011 | 3.23 | 0.010 | 0.0020 | 0.0021 | 3.06 | — | — | — | — | — |
| 109 | 0.0012 | 2.49 | 0.301 | 0.0023 | 0.0022 | 3.36 | — | — | — | — | — |
| 110 | 0.0008 | 2.50 | 0.006 | 0.0022 | 0.0022 | 3.09 | — | — | — | — | — |
| 111 | 0.0009 | 2.54 | 0.010 | 0.0020 | 0.0022 | 3.13 | — | — | — | — | — |
| 112 | 0.0010 | 2.49 | 0.006 | 0.0022 | 0.0019 | 3.07 | — | — | — | — | — |
| 113 | 0.0007 | 2.48 | 0.014 | 0.0020 | 0.0019 | 3.14 | — | — | — | — | — |
| 114 | 0.0009 | 2.50 | 0.014 | 0.0024 | 0.0019 | 3.12 | — | — | — | — | — |
| 115 | 0.0013 | 2.48 | 0.011 | 0.0021 | 0.0023 | 3.10 | — | — | — | — | — |
| 116 | 0.0012 | 2.49 | 0.601 | 0.0020 | 0.0021 | 3.69 | — | — | — | — | — |
| 117 | 0.0008 | 2.50 | 0.600 | 0.0020 | 0.0019 | 3.69 | — | — | — | — | — |
| 118 | 0.0012 | 2.49 | 0.600 | 0.0020 | 0.0020 | 3.71 | — | — | — | — | — |
| 119 | 0.0009 | 2.52 | 0.599 | 0.0018 | 0.0018 | — | 3.70 | — | — | — | — |
| 120 | 0.0011 | 2.47 | 0.599 | 0.0019 | 0.0021 | — | — | 3.68 | — | — | — |
| 121 | 0.0012 | 2.53 | 0.599 | 0.0019 | 0.0020 | — | — | — | 3.69 | — | — |
| 122 | 0.0008 | 2.52 | 0.599 | 0.0020 | 0.0021 | — | — | — | — | 3.73 | — |
| 123 | 0.0012 | 2.48 | 0.604 | 0.0021 | 0.0020 | — | — | — | — | — | 3.71 |
| 124 | 0.0012 | 2.48 | 0.598 | 0.0021 | 0.0019 | — | — | — | — | — | — |
| 125 | 0.0011 | 2.49 | 0.600 | 0.0020 | 0.0019 | 3.68 | — | — | — | — | — |
| 126 | 0.0012 | 2.48 | 0.600 | 0.0019 | 0.0020 | 3.70 | — | — | — | — | — |
| 127 | 0.0010 | 2.50 | 0.602 | 0.0020 | 0.0019 | 3.69 | — | — | — | — | — |
| 128 | 0.0011 | 2.52 | 0.900 | 0.0018 | 0.0021 | 4.00 | — | — | — | — | — |
| 129 | 0.0010 | 2.49 | 0.600 | 0.0020 | 0.0021 | 3.72 | — | — | — | — | — |
| 130 | 0.0011 | 2.50 | 0.598 | 0.0022 | 0.0021 | 3.72 | — | — | — | — | — |

| | Component (wt %) | | Hot rolling | | Cold rolling | | Second cold rolling |
|---|---|---|---|---|---|---|---|
| No. | Au | Formula (1) | Coiling temperature | Sheet thickness | Rolling reduction | Sheet thickness | Rolling reduction |
| 101 | — | 0.60 | 500 | 2.5 | 85% | 0.385 | 9% |
| 102 | — | 0.62 | 500 | 2.5 | 85% | 0.385 | 9% |
| 103 | — | 0.57 | 500 | 2.5 | 85% | 0.385 | 9% |
| 104 | — | 0.58 | 500 | 2.5 | 85% | 0.385 | 9% |
| 105 | — | 0.63 | 500 | 2.5 | 85% | 0.385 | 9% |
| 106 | — | 0.59 | 500 | 2.5 | 85% | 0.385 | 9% |
| 107 | 3.06 | 0.58 | 500 | 2.5 | 85% | 0.385 | 9% |
| 108 | — | −0.18 | 500 | 2.5 | 85% | 0.385 | 9% |
| 109 | — | 0.57 | 500 | 2.5 | 85% | 0.385 | 9% |
| 110 | — | 0.58 | 500 | 4.0 | 90% | 0.420 | 17% |
| 111 | — | 0.58 | 500 | 3.0 | 87% | 0.385 | 9% |
| 112 | — | 0.58 | 500 | 2.5 | 86% | 0.355 | 1% |
| 113 | — | 0.64 | 500 | 7.0 | 95% | 0.385 | 9% |
| 114 | — | 0.60 | 500 | 2.5 | 89% | 0.275 | 9% |
| 115 | — | 0.61 | 500 | 1.5 | 93% | 0.110 | 9% |
| 116 | — | 0.60 | 700 | 2.8 | 86% | 0.385 | 9% |
| 117 | — | 0.59 | 600 | 2.8 | 86% | 0.385 | 9% |
| 118 | — | 0.61 | 500 | 2.8 | 86% | 0.385 | 9% |
| 119 | — | 0.58 | 500 | 2.8 | 86% | 0.385 | 9% |
| 120 | — | 0.61 | 500 | 2.8 | 86% | 0.385 | 9% |
| 121 | — | 0.55 | 500 | 2.8 | 86% | 0.385 | 9% |
| 122 | — | 0.60 | 500 | 2.8 | 86% | 0.385 | 9% |
| 123 | — | 0.63 | 500 | 2.8 | 86% | 0.385 | 9% |
| 124 | 3.69 | 0.61 | 500 | 2.8 | 86% | 0.385 | 9% |
| 125 | — | 0.59 | 400 | 2.8 | 86% | 0.385 | 9% |
| 126 | — | 0.62 | 300 | 2.8 | 86% | 0.385 | 9% |
| 127 | — | 0.59 | 200 | 2.8 | 86% | 0.385 | 9% |
| 128 | — | 0.58 | 500 | 2.8 | 86% | 0.385 | 9% |
| 129 | — | 0.63 | 500 | 2.0 | 81% | 0.385 | 9% |
| 130 | — | 0.62 | 500 | 1.8 | 79% | 0.385 | 9% |

TABLE 2

| | Characteristics of steel sheet | | B50(T) | | | | | | | | | |
|---|---|---|---|---|---|---|---|---|---|---|---|---|
| No. | {100}<011> | Sheet thickness | B50D1 | B50D2 | B50L | B50C | Formula (2) | Formula (3) | Formula (4) | Formula (5) | Formula (6) | Note |
| 101 | 14.6 | 0.35 | 1.809 | 1.812 | 1.558 | 1.550 | Satisfied | Satisfied | Satisfied | Not satisfied | Satisfied | Present Invention |
| 102 | 14.9 | 0.35 | 1.814 | 1.809 | 1.563 | 1.553 | Satisfied | Satisfied | Satisfied | Not satisfied | Satisfied | Present Invention |
| 103 | 15.2 | 0.35 | 1.809 | 1.814 | 1.563 | 1.547 | Satisfied | Satisfied | Satisfied | Not satisfied | Satisfied | Present Invention |
| 104 | 15.1 | 0.35 | 1.807 | 1.814 | 1.564 | 1.547 | Satisfied | Satisfied | Satisfied | Not satisfied | Satisfied | Present Invention |
| 105 | 15.3 | 0.35 | 1.813 | 1.807 | 1.558 | 1.548 | Satisfied | Satisfied | Satisfied | Not satisfied | Satisfied | Present Invention |
| 106 | 14.8 | 0.35 | 1.814 | 1.808 | 1.556 | 1.547 | Satisfied | Satisfied | Satisfied | Not satisfied | Satisfied | Present Invention |
| 107 | 14.6 | 0.35 | 1.807 | 1.807 | 1.559 | 1.547 | Satisfied | Satisfied | Satisfied | Not satisfied | Satisfied | Present Invention |
| 108 | 0.3 | 0.35 | 1.548 | 1.551 | 1.633 | 1.583 | Not satisfied | Not satisfied | Not satisfied | Not satisfied | Not satisfied | Comparative Example |
| 109 | 15.4 | 0.35 | 1.792 | 1.787 | 1.548 | 1.554 | Satisfied | Satisfied | Satisfied | Not satisfied | Not satisfied | Present Invention |
| 110 | 25.1 | 0.35 | 1.846 | 1.851 | 1.538 | 1.532 | Satisfied | Satisfied | Satisfied | Satisfied | Satisfied | Present Invention |
| 111 | 19.8 | 0.35 | 1.818 | 1.817 | 1.547 | 1.540 | Satisfied | Satisfied | Satisfied | Not satisfied | Satisfied | Present Invention |
| 112 | 3.1 | 0.35 | 1.684 | 1.678 | 1.586 | 1.587 | Not satisfied | Satisfied | Not satisfied | Not satisfied | Not satisfied | Comparative Example |
| 113 | 34.6 | 0.35 | 1.861 | 1.862 | 1.551 | 1.551 | Satisfied | Satisfied | Satisfied | Not satisfied | Satisfied | Comparative Example |
| 114 | 20.0 | 0.25 | 1.812 | 1.813 | 1.541 | 1.526 | Satisfied | Satisfied | Satisfied | Not satisfied | Satisfied | Present Invention |
| 115 | 19.7 | 0.10 | 1.839 | 1.843 | 1.586 | 1.590 | Satisfied | Satisfied | Satisfied | Not satisfied | Satisfied | Present Invention |
| 116 | 7.0 | 0.35 | 1.727 | 1.730 | 1.528 | 1.529 | Satisfied | Satisfied | Satisfied | Not satisfied | Not satisfied | Present Invention |
| 117 | 12.0 | 0.35 | 1.773 | 1.767 | 1.538 | 1.532 | Satisfied | Satisfied | Satisfied | Not satisfied | Not satisfied | Present Invention |
| 118 | 15.0 | 0.35 | 1.784 | 1.778 | 1.543 | 1.531 | Satisfied | Satisfied | Satisfied | Not satisfied | Not satisfied | Present Invention |
| 119 | 14.6 | 0.35 | 1.786 | 1.785 | 1.540 | 1.532 | Satisfied | Satisfied | Satisfied | Not satisfied | Not satisfied | Present Invention |
| 120 | 14.6 | 0.35 | 1.783 | 1.788 | 1.541 | 1.528 | Satisfied | Satisfied | Satisfied | Not satisfied | Not satisfied | Present Invention |
| 121 | 15.3 | 0.35 | 1.784 | 1.785 | 1.539 | 1.531 | Satisfied | Satisfied | Satisfied | Not satisfied | Not satisfied | Present Invention |
| 122 | 14.7 | 0.35 | 1.783 | 1.785 | 1.539 | 1.533 | Satisfied | Satisfied | Satisfied | Not satisfied | Not satisfied | Present Invention |
| 123 | 15.1 | 0.35 | 1.786 | 1.787 | 1.541 | 1.529 | Satisfied | Satisfied | Satisfied | Not satisfied | Not satisfied | Present Invention |
| 124 | 15.1 | 0.35 | 1.785 | 1.785 | 1.538 | 1.527 | Satisfied | Satisfied | Satisfied | Not satisfied | Not satisfied | Present Invention |
| 125 | 12.2 | 0.35 | 1.768 | 1.772 | 1.541 | 1.531 | Satisfied | Satisfied | Satisfied | Not satisfied | Not satisfied | Present Invention |
| 126 | 11.2 | 0.35 | 1.762 | 1.765 | 1.536 | 1.531 | Satisfied | Satisfied | Satisfied | Not satisfied | Not satisfied | Present Invention |
| 127 | 6.9 | 0.35 | 1.734 | 1.735 | 1.517 | 1.529 | Satisfied | Satisfied | Satisfied | Not satisfied | Not satisfied | Present Invention |
| 128 | 15.2 | 0.35 | 1.772 | 1.774 | 1.539 | 1.519 | Satisfied | Satisfied | Satisfied | Not satisfied | Not satisfied | Present Invention |
| 129 | 10.4 | 0.35 | 1.746 | 1.746 | 1.532 | 1.521 | Satisfied | Satisfied | Satisfied | Not satisfied | Not satisfied | Present Invention |
| 130 | 5.9 | 0.35 | 1.731 | 1.736 | 1.519 | 1.528 | Satisfied | Satisfied | Satisfied | Not satisfied | Not satisfied | Present Invention |

Underlined values in Table 1 and Table 2 indicate that the conditions deviate from the scope of the present invention. In all of No. 101 to No. 107, No. 109 to No. 111, and No. 114 to No. 130, which were invention examples, the magnetic flux densities B50 were favorable values both in the 45° direction and on the whole circumference average. However, in No. 116 and No. 127, since the coiling temperatures were outside the appropriate range, the magnetic flux densities B50 were slightly low. In No. 129 and No. 130, since the rolling reductions of the cold rolling were small, the magnetic flux densities B50 were slightly low compared with No. 118 in which the components and the coiling temperature were the same. On the other hand, in No. 108, which was a comparative example, since the Si concentration was high, the value of the left side of the formula was 0 or less, and the composition did not undergo α-γ transformation, the magnetic flux densities B50 were all low. In No. 112, which was a comparative example, since the skin pass rolling reduction was decreased, the {100}<011> strength was less than 5, and all of the magnetic flux densities B50 were low. No. 113, which was a comparative example, the {100}<011> strength became 30 or more, which deviated from the present invention. In No. 113, since the thickness of the hot-rolled sheet was 7 mm, there was a drawback of an operation difficulty.

Second Example

Molten steel was cast, thereby producing ingots having components shown in Table 3 below. After that, the produced ingots were hot-rolled by being heated up to 1150° C. and rolled such that the sheet thicknesses became 2.5 mm. In addition, after the end of finish rolling, the hot-rolled steel sheets were coiled. The finishing temperatures in a stage of the final pass of the finish rolling at this time were 830° C. and were all temperatures higher than the Ar1 temperature.

Next, the hot-rolled steel sheets were pickled to remove scales and cold-rolled until the sheet thicknesses became 0.385 mm. In addition, process annealing was performed in a non-oxidizing atmosphere, and the temperatures in the process annealing were controlled such that the recrystallization rates became 85%. Next, a second cold rolling (skin pass rolling) was performed until the sheet thicknesses became 0.35 mm.

Next, in order to investigate the magnetic characteristics, after the second cold rolling (skin pass rolling), final annealing was performed at 800° C. for 30 seconds to produce 55 mm×55 mm samples by shearing, then, stress relief annealing was performed at 800° C. for two hours, and the magnetic flux densities B50 and the iron losses W10/400 were measured. The magnetic flux densities B50 were measured in the same order as in the first example. Incidentally, the iron loss W10/400 was measured as an energy loss (W/kg) that was caused in a sample when an alternating-current magnetic field of 400 Hz was applied such that the maximum magnetic flux density became LOT. As the iron loss, the average value of the results measured at 0°, 45°, 90°, and 135° with respect to the rolling direction was employed.

TABLE 3

| | Component (wt %) | | | | | | | | | | |
|---|---|---|---|---|---|---|---|---|---|---|---|
| No. | C | Si | sol-Al | S | N | Mn | Sn | Sb | P | Mg | Ca |
| 201 | 0.0006 | 2.49 | 0.010 | 0.0022 | 0.0019 | 3.10 | — | — | — | — | — |
| 202 | 0.0010 | 2.53 | 0.007 | 0.0022 | 0.0017 | 3.07 | 0.052 | — | — | — | — |
| 203 | 0.0009 | 2.50 | 0.014 | 0.0019 | 0.0019 | 3.12 | — | 0.053 | — | — | — |
| 204 | 0.0010 | 2.52 | 0.009 | 0.0018 | 0.0022 | 3.11 | — | — | 0.048 | — | — |
| 205 | 0.0010 | 2.47 | 0.007 | 0.0023 | 0.0024 | 3.14 | — | — | — | 0.0051 | — |
| 206 | 0.0007 | 2.48 | 0.009 | 0.0018 | 0.0022 | 3.11 | — | — | — | — | 0.0053 |
| 207 | 0.0010 | 2.47 | 0.012 | 0.0019 | 0.0017 | 3.09 | — | — | — | — | — |
| 208 | 0.0009 | 2.54 | 0.014 | 0.0017 | 0.0016 | 3.12 | — | — | — | — | — |
| 209 | 0.0011 | 2.48 | 0.010 | 0.0023 | 0.0018 | 3.12 | — | — | — | — | — |
| 210 | 0.0008 | 2.50 | 0.011 | 0.0021 | 0.0020 | 3.11 | — | — | — | — | — |
| 211 | 0.0012 | 2.49 | 0.007 | 0.0017 | 0.0020 | 3.14 | — | — | — | — | — |
| 212 | 0.0009 | 2.49 | 0.008 | 0.0020 | 0.0022 | 3.13 | — | — | — | — | — |
| 213 | 0.0012 | 2.46 | 0.011 | 0.0019 | 0.0016 | 3.07 | — | — | — | — | — |
| 214 | 0.0008 | 2.52 | 0.011 | 0.0021 | 0.0021 | 3.10 | — | — | — | — | — |

| | Component (wt %) | | | | | | | | |
|---|---|---|---|---|---|---|---|---|---|
| No. | Sr | Ba | Ce | La | Nd | Pr | Zn | Cd | Formula (1) |
| 201 | — | — | — | — | — | — | — | — | 0.60 |
| 202 | — | — | — | — | — | — | — | — | 0.54 |
| 203 | — | — | — | — | — | — | — | — | 0.60 |
| 204 | — | — | — | — | — | — | — | — | 0.58 |
| 205 | — | — | — | — | — | — | — | — | 0.66 |
| 206 | — | — | — | — | — | — | — | — | 0.62 |
| 207 | 0.0051 | — | — | — | — | — | — | — | 0.61 |
| 208 | — | 0.0047 | — | — | — | — | — | — | 0.56 |
| 209 | — | — | 0.0049 | — | — | — | — | — | 0.63 |
| 210 | — | — | — | 0.0052 | — | — | — | — | 0.60 |
| 211 | — | — | — | — | 0.0051 | — | — | — | 0.64 |
| 212 | — | — | — | — | — | 0.0048 | — | — | 0.63 |
| 213 | — | — | — | — | — | — | 0.0054 | — | 0.59 |
| 214 | — | — | — | — | — | — | — | 0.0052 | 0.57 |

TABLE 4

| | Characteristics of steel sheet | | Magnetic characteristics after annealing at 800° C. for two hours | | | | | |
|---|---|---|---|---|---|---|---|---|
| No. | {100}<011> | Sheet thickness | B50D1 | B50D2 | B50L | B50C | Whole circumference average W10/400 | Note |
| 201 | 14.7 | 0.35 | 1.811 | 1.809 | 1.561 | 1.553 | 15.28 | Present Invention |
| 202 | 15.1 | 0.35 | 1.824 | 1.820 | 1.574 | 1.564 | 15.30 | Present Invention |
| 203 | 15.1 | 0.35 | 1.822 | 1.822 | 1.568 | 1.561 | 15.33 | Present Invention |
| 204 | 15.4 | 0.35 | 1.818 | 1.821 | 1.567 | 1.559 | 15.32 | Present Invention |
| 205 | 15.2 | 0.35 | 1.809 | 1.810 | 1.561 | 1.551 | 14.89 | Present Invention |
| 206 | 14.7 | 0.35 | 1.808 | 1.812 | 1.562 | 1.551 | 14.90 | Present Invention |
| 207 | 14.6 | 0.35 | 1.812 | 1.807 | 1.556 | 1.550 | 14.93 | Present Invention |
| 208 | 15.3 | 0.35 | 1.813 | 1.809 | 1.557 | 1.549 | 14.91 | Present Invention |
| 209 | 15.3 | 0.35 | 1.812 | 1.808 | 1.562 | 1.554 | 14.89 | Present Invention |
| 210 | 14.8 | 0.35 | 1.809 | 1.810 | 1.562 | 1.547 | 14.92 | Present Invention |
| 211 | 14.9 | 0.35 | 1.813 | 1.808 | 1.563 | 1.551 | 14.88 | Present Invention |
| 212 | 15.2 | 0.35 | 1.813 | 1.810 | 1.563 | 1.548 | 14.91 | Present Invention |
| 213 | 14.8 | 0.35 | 1.813 | 1.810 | 1.563 | 1.553 | 14.94 | Present Invention |
| 214 | 15.3 | 0.35 | 1.811 | 1.807 | 1.564 | 1.553 | 14.88 | Present Invention |

No. 201 to No. 214 were all invention examples and all had favorable magnetic characteristics. In particular, the magnetic flux densities B50 were higher in No. 202 to No. 204 than in No. 201, No. 205 to No. 214, and the iron losses W10/400 were lower in No. 205 to No. 214 than in No. 201 to No. 204.

The present inventors studied how to configure a laminated core such that the characteristics of such a non-oriented electrical steel sheet can be effectively utilized and found each embodiment to be described below.

Hereinafter, embodiments of the present invention will be described with reference to the drawings. In the following description, unless particularly otherwise described, electrical steel sheets refer to the non-oriented electrical steel sheet described in the section (electrical steel sheet used for laminated core). In the following description, the direction inclined by 45° from the rolling direction and the direction inclined by 135° from the rolling direction in the description of (electrical steel sheet used for laminated core) will be collectively referred to as two directions in which the smaller angle of the angles with respect to the rolling direction is 45° as necessary. Regarding the 45°, both clockwise angles and counter-clockwise angles are expressed as positive values. In a case where the clockwise direction is expressed as a negative direction and the counter-clockwise direction is expressed as a positive direction, the two directions in which the smaller angle of angles with respect to the rolling direction is 45° are two directions in which the angle with respect to the rolling direction is 45° and −45°. In addition, the direction inclined by θ° from the rolling direction will be referred to as the direction in which an angle formed with the rolling direction is θ° as necessary. As described above, the direction inclined by θ° from the rolling direction and the direction in which an angle formed with the rolling direction is θ° have the same meaning. In addition, in the following description, the fact that lengths, directions, positions, and the like are the same (coincide) does not only mean a case where lengths, directions, positions, and the like are (strictly) the same (coincide), but also mean a case where lengths, directions, positions, and the like are (strictly) the same (coincide) without departing from the gist of the invention (for example, within a range of an error that occurs in manufacturing steps). In addition, in each drawing, the X-Y-Z coordinates indicate orientation relationships in each drawing. The reference sign • in ○ indicates a direction from the back side toward the front side of the paper.

First Embodiment

First, a first embodiment will be described. In the present embodiment, a case where the laminated core is an EI core will be described as an example.

Figure 2:
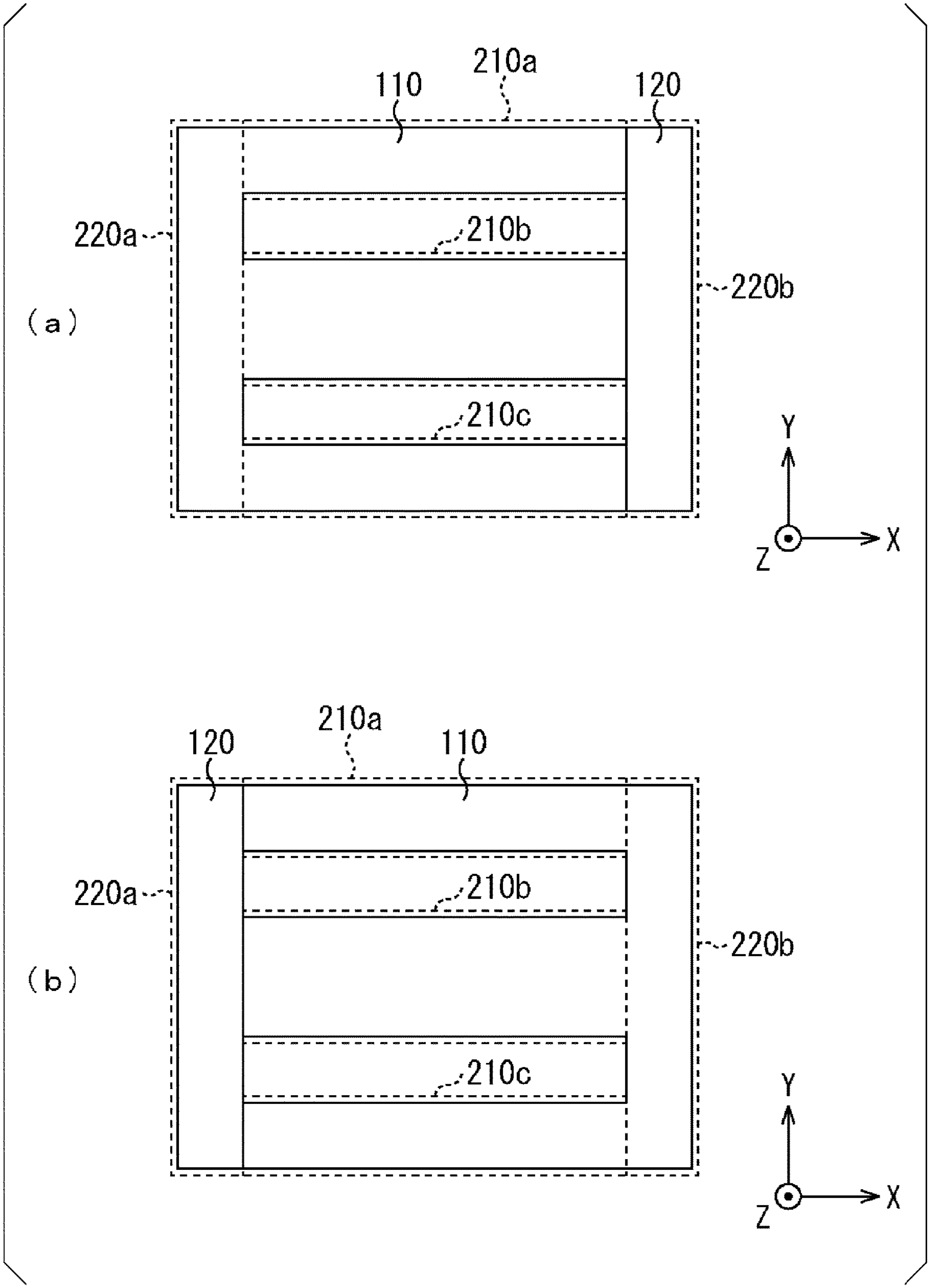
FIG. 2 is a view showing a first example of disposition of electrical steel sheets in each layer of the laminated core.

FIG. 1 is a view showing an example of the external appearance configuration of a laminated core 100. In FIG. 1, "· · ·" shown side by side in the Z-axis direction indicates that what is shown in the drawing is continuously disposed repeatedly in the negative direction of the Z axis (this is also true for other drawings). FIG. 2 is a view showing an example of the disposition of electrical steel sheets in each layer of the laminated core 100. FIG. 2(*a*) is a view showing an example of the disposition of odd-numbered electrical steel sheets from the top (counted from the positive direction side of the Z axis). FIG. 2(*b*) is a view showing an example of the disposition of even-numbered electrical steel sheets from the top.

In FIG. 1 and FIG. 2, the laminated core 100 has a plurality of E-type electrical steel sheets 110 and a plurality of I-type electrical steel sheets 120.

The laminated core 100 has three legs 210*a* to 210*c* that are disposed at intervals in the Y-axis direction, having the X-axis direction as the longitudinal direction (extension direction), and two yokes 220*a* and 220*b* that are disposed at intervals in the X-axis direction, having the Y-axis direction as the longitudinal direction (extension direction). One of the two yokes 220*a* and 220*b* is disposed at first ends of the three legs 210*a* to 210*c* in the longitudinal direction (X-axis direction). The other of the two yokes 220*a* and 220*b* is disposed at the other ends of the three legs 210*a* to 210*c* in the longitudinal direction (X-axis direction). The three legs 210*a* to 210*c* and the two yokes 220*a* and 220*b* are magnetically coupled. As shown in FIG. 2(*a*) and FIG. 2(*b*), the shape of the sheet surface in the same layer of the laminated core 100 is generally a shape in which a letter E and a letter I are combined (squarish eight shape).

An E-type electrical steel sheet 110 configures the three legs 210*a* to 210*c* of the laminated core 100 and one of the two yokes 220*a* and 220*b* of the laminated core 100. The three legs 210*a* to 210*c* that are configured by the E-type electrical steel sheet 110 and the yokes 220*a* and 220*b* that are configured by the E-type electrical steel sheet 110 are formed by being integrally cut out as described below, and there are no boundaries to be described below therebetween. An I-type electrical steel sheet 120 configures one of the two yokes 220*a* and 220*b* of the laminated core 100. Between the yokes 220*a* and 220*b* that are configured by the I-type electrical steel sheet 120 and the three legs 210*a* to 210*c* that are configured by the E-type electrical steel sheet 110, there is a boundary formed by the combination of the letter E and the letter I.

The interval between the E-type electrical steel sheet 110 and the I-type electrical steel sheet 120 that are disposed in the same layer is preferably as short as possible. The sheet thickness portions of the tip ends of the three legs 210*a* to 210*c* that are configured by the E-type electrical steel sheet 110 and the sheet thickness portions of the yokes 220*a* and 220*b* that are configured by the I-type electrical steel sheet 120, which are disposed in the same layer, are more preferably in contact with each other.

Directions in which the magnetic characteristics of the E-type electrical steel sheet 110 are most excellent coincide with two directions of the longitudinal direction (X-axis direction) of the three legs 210*a* to 210*c* that are configured by the E-type electrical steel sheet 110 and the longitudinal direction (Y-axis direction) of the yokes 220*a* and 220*b* that are configured by the E-type electrical steel sheet 110.

A direction in which the magnetic characteristics of the I-type electrical steel sheet 120 are most excellent coincides with the longitudinal direction (Y-axis direction) of the yokes 220*a* and 220*b* that are configured by the I-type electrical steel sheet 120.

In the following description, the direction in which the magnetic characteristics are most excellent will be referred to as the direction of easy magnetization as necessary.

Figure 3:
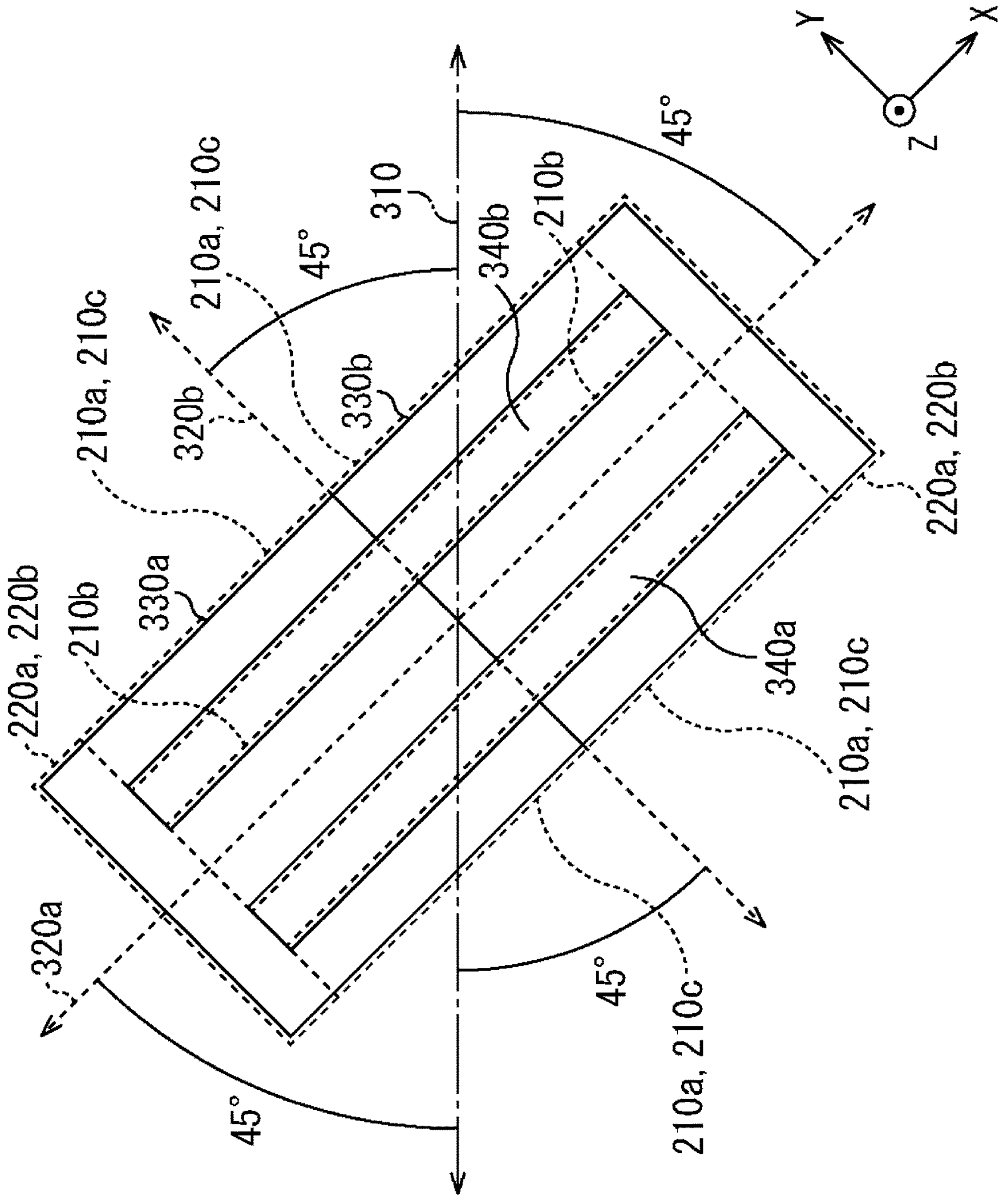
FIG. 3 is a view showing an example of a method for cutting out an E-type electrical steel sheet and an I-type electrical steel sheet from an electrical steel strip.

FIG. 3 is a view showing an example of a method for cutting out the E-type electrical steel sheet 110 and the I-type electrical steel sheet 120 from an electrical steel sheet uncoiled from a coil-like state. In the following description, the electrical steel sheet uncoiled from the coil-like state will be simply referred to as the electrical steel strip as necessary. In addition, in FIG. 3, for ease of description, the legs 210*a* to 210*c* and the yokes 220*a* and 220*b* corresponding to the cut-out electrical steel sheet are shown together.

In FIG. 3, an imaginary line 310 indicated by an alternate long and short dash line indicates a rolling direction of the electrical steel strip (hereinafter, also referred to as the rolling direction 310). Imaginary lines 320*a* and 320*b* indicated by broken lines indicate the directions of easy magnetization of the electrical steel strip (hereinafter, also referred to as the directions of easy magnetization 320*a* and 320*b*). In FIG. 3, directions parallel to the imaginary line 310 are all the rolling direction of the electrical steel strip, and directions parallel to the imaginary lines 320*a* and 320*b* are all the directions of easy magnetization of the electrical steel strip.

As described above, two directions at an angle of 45° with respect to the rolling direction 310 are the directions of easy magnetization. Regarding the angles with respect to the rolling direction 310 mentioned herein, angles in any direction of a direction from the X axis toward the Y axis (counter-clockwise direction on the paper surface) and a direction from the Y axis to the X axis have a positive value. In addition, the angles of the two directions are both smaller angles of the angles with respect to the rolling direction.

In the example shown in FIG. 3, regions 330*a* and 330*b* that configure the E-type electrical steel sheet 110 are cut out from the electrical steel strip such that the longitudinal direction of the three legs 210*a* to 210*c* that are configured by the E-type electrical steel sheet 110 coincides with one direction of easy magnetization 320*a* of the two directions of easy magnetization 320*a* and 320*b* of the electrical steel strip and the longitudinal direction of the yokes 220*a* and 220*b* that are configured by the E-type electrical steel sheet 110 coincides with the other direction of easy magnetization 320*b* of the two directions of easy magnetization 320*a* and 320*b* of the electrical steel strip. In FIG. 3, the solid lines indicate cut-out positions. For example, due to the influence of manufacturing errors, there is a case where the longitudinal direction of the legs 210*a* to 210*c* and one direction of easy magnetization 320*a* do not strictly coincide with each other or the longitudinal direction of the yokes 220*a* and 220*b* and the other direction of easy magnetization 320*b* do not strictly coincide with each other. Therefore, the fact that the longitudinal directions of the legs 210*a* to 210*c* or the longitudinal direction of the yokes 220*a* and 220*b* and the directions of easy magnetization 320*a* and 320*b* coincide with each other also includes cases where these two directions do not strictly coincide with each other (for example, cases where both directions deviate from each other by ±5° or less). This is also true for expressions that the longitudinal direction of the leg, the yoke, the region, or the like and the direction of easy magnetization coincide with each other in the following description.

In the example shown in FIG. 3, the regions 330*a* and 330*b* that configure the two E-type electrical steel sheets 110 are cut out from the electrical steel strip such that the tip ends of the three legs 210*a* to 210*c* that are configured by the two E-type electrical steel sheets 110 meet each other. The regions are cut out using, for example, blanking for which a mold is used, wire cutting, or the like.

In addition, when the regions 330*a* and 330*b* that configure the two E-type electrical steel sheets 110 are cut out from the electrical steel strip such that the tip ends of the three legs 210*a* to 210*c* meet each other, I-shaped regions 340*a* and 340*b* between the three legs 210*a* to 210*c* that are configured by the two E-type electrical steel sheets 110 are also cut out. The longitudinal direction of the I-shaped regions 340*a* and 340*b* coincides with one direction of easy magnetization 320*a* of the two directions of easy magnetization 320*a* and 320*b* of the electrical steel strip. Therefore, in the present embodiment, the I-type electrical steel sheets 120 are formed using the I-shaped regions 340*a* to 340*b*.

In a case where the intervals (in the Y-axis direction) between the two legs 210*a* and 210*b* and 210*b* and 210*c* adjacent to each other of the three legs 210*a* to 210*c* that are configured by the E-type electrical steel sheet 110 are the same as the length in the width direction (Y-axis direction) of the I-type electrical steel sheet 120, a process for adjusting the lengths in the Y-axis direction of the I-shaped regions 340*a* and 340*b* becomes unnecessary. In addition, in a case where the lengths in the longitudinal direction (X-axis direction) of the three legs 210*a* to 210*c* that are configured by the E-type electrical steel sheet 110 are the same as the length of the I-type electrical steel sheet 120 in the longitudinal direction (X-axis direction), it is possible to determine the regions of the I-type electrical steel sheets 120 in the longitudinal direction by cutting the I-shaped regions 340*a* to 340*b* at the central positions in the longitudinal direction (X-axis direction).

As described above, when the regions between the three legs 210*a* to 210*c* that are configured by the E-type electrical steel sheet 110 are used as the I-type electrical steel sheets 120, it is possible to reduce regions in the region of the electrical steel strip that become neither the E-type electrical steel sheet 110 nor the I-type electrical steel sheet 120.

The intervals (in the Y-axis direction) between the two legs 210*a* and 210*b* and 210*b* and 210*c* adjacent to each other of the three legs 210*a* to 210*c* that are configured by the E-type electrical steel sheet 110 are set to be the same as the length in the width direction (Y-axis direction) of the I-type electrical steel sheet 120, and the lengths in the longitudinal direction (X-axis direction) of the three legs 210*a* to 210*c* that are configured by the E-type electrical steel sheet 110 are set to be the same as the length of the I-type electrical steel sheet 120 in the longitudinal direction (X-axis direction). In this case, the regions 330*a* and 330*b* that configure the two E-type electrical steel sheets 110 are cut out from the electrical steel strip such that the tip ends of the three legs 210*a* to 210*c* meet each other, and the I-shaped regions 340*a* and 340*b* between the three legs 210*a* to 210*c* are cut at the central positions in the longitudinal direction (X-axis direction), whereby two E-type electrical steel sheets 110 and two I-type electrical steel sheets 120 are formed. In this case, the regions between the three legs 210*a* to 210*c* that are configured by the E-type electrical steel sheet 110 can be used as the I-type electrical steel sheets 120 without waste.

FIG. 3 shows only an appearance in which two E-type electrical steel sheets 110 and two I-type electrical steel sheets 120 are cut out. However, when the regions 330*a* and 330*b* shown in FIG. 3 are continuously provided side by side, it is possible to cut out a large number of E-type electrical steel sheets 110 and a large number of I-type electrical steel sheets 120 from the electrical steel strip. When the E-type electrical steel sheets 110 and the I-type electrical steel sheets 120 are cut out as shown in FIG. 3, it is possible to reduce the regions that become neither the E-type electrical steel sheet 110 nor the I-type electrical steel sheet 120, which is preferable. However, it is not necessarily required to cut out the E-type electrical steel sheets 110 and the I-type electrical steel sheets 120 as shown in FIG. 3. For example, in a case where the I-type electrical steel sheet protrudes from the regions between the two legs 210*a* and 210*b* and 210*b* and 210*c* adjacent to each other of the three legs 210*a* to 210*c* that are configured by the E-type electrical steel sheet, the I-type electrical steel sheets are cut out from a region different from the regions of the electrical steel strip.

Layers obtained by combining the (one) E-type electrical steel sheet 110 and the (one) I-type electrical steel sheet 120 obtained as described above to form a squarish eight shape as a whole are stacked such that the contours of the squarish eight shapes are matched to each other, whereby the laminated core 100 is configured. At this time, the E-type electrical steel sheets 110 and the I-type electrical steel sheets 120 are combined such that the directions in which the tip ends of the legs 210*a* to 210*c* that are configured by the E-type electrical steel sheet 110 are oriented become 180° opposite to each other alternately. In the example shown in FIG. 1 and FIG. 2, the tip ends of the legs 210*a* to 210*c* that are configured by the E-type electrical steel sheet 110 are oriented toward the positive direction side of the X axis in the odd-numbered layers from the top, and the tip ends of the legs 210*a* to 210*c* that are configured by the E-type electrical steel sheet 110 are oriented toward the negative direction side of the X axis in the even-numbered layers from the top.

As described above, one layer (single layer) in which one E-type electrical steel sheet 110 and one I-type electrical steel sheet 120 are combined may be laminated such that the directions in which the tip ends of the legs 210*a* to 210*c* of the E-type electrical steel sheet 110 are oriented become 180° opposite to each other alternately. Unlike a lamination method for a plurality of layers to be described below, this lamination method for a single layer does not require a structure for laminating the electrical steel sheet as it is without changing the orientation, which makes it possible to simplify manufacturing facilities. In addition, first laminated bodies in which a plurality of the above-described layers are laminated with the tip ends of the legs 210*a* to 210*c* of the E-type electrical steel sheet 110 oriented in the same direction and second laminated bodies in which a plurality of the above-described layers are laminated with the tip ends of the legs 210*a* to 210*c* of the E-type electrical steel sheet 110 oriented in the 180° opposite direction may be alternately laminated. Applying this lamination method for a plurality of layers improves the efficiency of core production.

Figure 4:
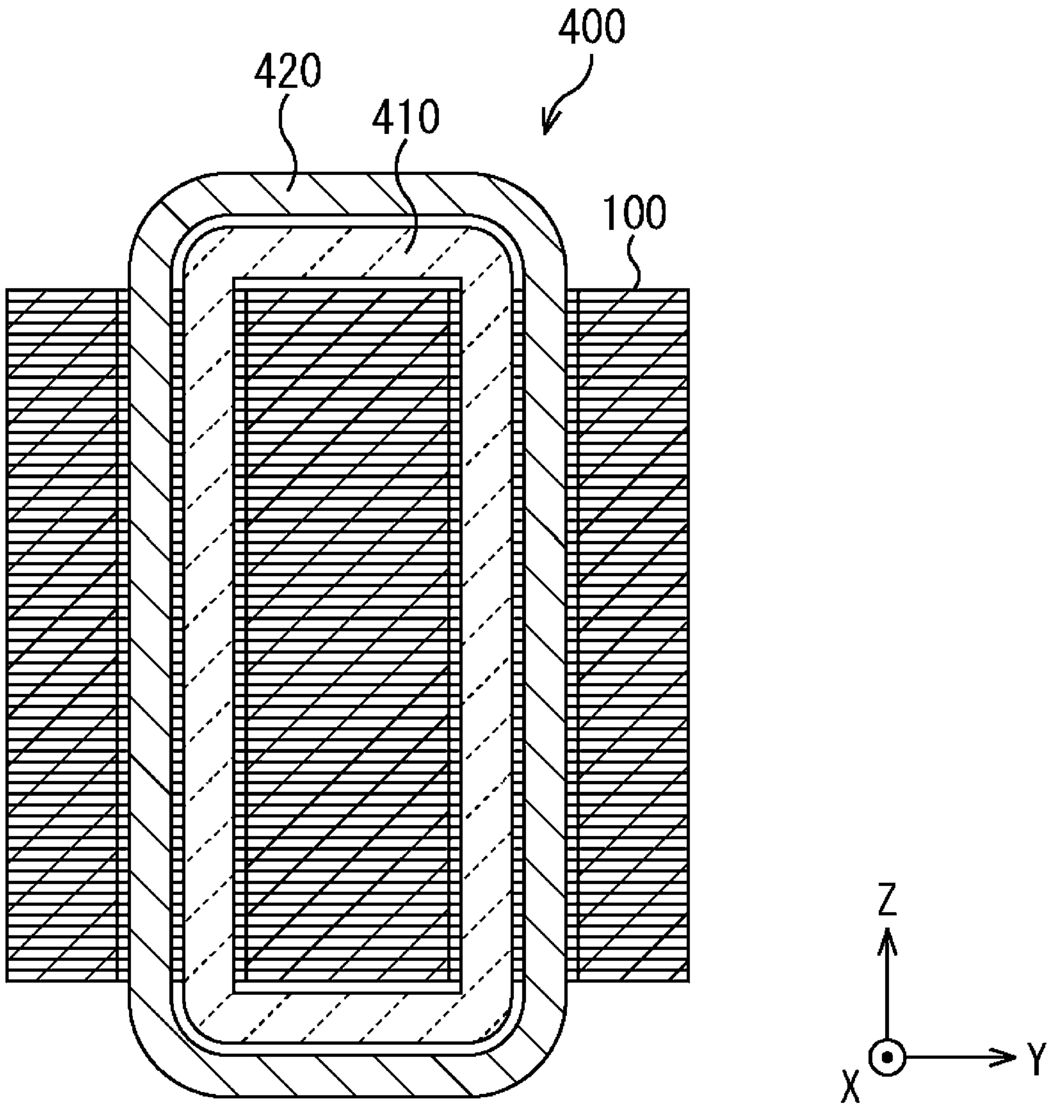
FIG. 4 is a view showing a first example of the configuration of an electrical device.

FIG. 4 is a view showing an example of the configuration of an electrical device configured using the laminated core 100. In the present embodiment, a case where an electrical device 400 is a single-phase transformer will be described as an example. FIG. 4 shows a cross section of the laminated core 100 in the case of being cut at the center of the legs 210*a* to 210*c* of the laminated core 100 in the longitudinal direction (X-axis direction) parallel to the longitudinal direction (Y-axis direction) of the yokes 220*a* and 220*b* of the laminated core 100 and the lamination direction (Z-axis direction). In FIG. 4, for ease of description and expression, a part of the configuration of the electrical device 400 is simplified or omitted.

In FIG. 4, the electrical device 400 has the laminated core 100, a primary coil 410, and a secondary coil 420.

An input voltage (excitation voltage) is applied to both ends of the primary coil 410. An output voltage corresponding to the turn ratio between the primary coil 410 and the secondary coil 420 is output at both ends of the secondary coil 420. The exciting frequency of the electrical device 400 (the frequency of the exciting current flowing through the primary coil 410) may be a commercial frequency or a frequency higher than the commercial frequency (for example, a frequency in a range of 100 Hz or higher and lower than 10 kHz).

The primary coil 410 is disposed so as to surround (the side surfaces of) the central leg 210*b* of the three legs 210*a* to 210*c* of the laminated core 100. The primary coil 410 is electrically insulated from the laminated core 100 and the secondary coil 420. The secondary coil 420 is disposed outside the primary coil 410 so as to surround (the side surfaces of) the central leg of the three legs of the laminated core 100. The secondary coil 420 is electrically insulated from the laminated core 100 and the primary coil 410.

The total value of the thickness of the primary coil 410 and the thickness of the secondary coil 420 is smaller than the intervals (in the Y-axis direction) between the two legs 210*a* and 210*b* and 210*b* and 210*c* adjacent to each other of the three legs 210*a* to 210*c* of the laminated core 100.

At the time of configuring the electrical device 400, first, the primary coil 410 and the secondary coil 420 are produced. In addition, the primary coil 410 and the secondary coil 420 are disposed as shown in FIG. 4. Specifically, the primary coil 410 and the secondary coil 420 are disposed such that the primary coil 410 is present relatively inside, the secondary coil 420 is present relatively outside, and the primary coil 410 and the secondary coil 420 are concentric with each other.

After that, the central legs 210*b* of the E-type electrical steel sheets 110 are sequentially inserted into a hollow portion of the primary coil 410 such that the directions in which the tip ends of the legs 210*a* to 210*c* of the E-type electrical steel sheets 110 are oriented become 180° opposite to each other alternately, and the I-type electrical steel sheets 120 are disposed at the tip ends of the legs 210*a* to 210*c* that are configured by the E-type electrical steel sheets 110 such that the shape of the sheet surface becomes a squarish eight shape in which a letter E and a letter I are combined in the same layer. The E-type electrical steel sheets 110 and the I-type electrical steel sheets 120 are disposed as described above, whereby the laminated core 100 in a state where the primary coil 410 and the secondary coil 420 are disposed in the central legs of the E-type electrical steel sheets 110 is configured. In such a case, it becomes unnecessary to pass electric wires that configure the primary coil 410 and the secondary coil 420 through the regions between the two legs 210*a* and 210*b* and 210*b* and 210*c* adjacent to each other of the three legs 210*a* to 210*c* of the laminated core 100 in each coiling. Therefore, it is possible to easily configure the primary coil 410 and the secondary coil 420.

The laminated core 100 configured as described above is fixed by a well-known method. For example, the laminated core 100 can be fixed by attaching a case in a state of being electrically insulated from the laminated core 100 so as to cover the side surfaces of the laminated core 100 (the surfaces where the sheet thickness portion of the electrical steel sheet is exposed). In addition, through-holes that penetrate the laminated core 100 in the lamination direction are formed at the four corner portions of the sheet surface of the laminated core 100, and bolts are passed through the through-holes in a state of being electrically insulated from the laminated core 100 to tighten the laminated core 100 with the bolts, whereby the laminated core 100 can be fixed. In addition, the laminated core 100 may be fixed by providing clumping to the laminated core 100. In addition, the laminated core 100 may be fixed by welding the side surfaces of the laminated core 100. In addition, an impregnation treatment may be performed on the electrical device 400 using an insulating material such as varnish.

In addition, as described in the section (electrical steel sheet used for laminated core), stress relief annealing is performed on the laminated core 100.

As described above, in the present embodiment, the E-type electrical steel sheet 110 and the I-type electrical steel sheet 120 are configured such that two directions of the longitudinal direction (X-axis direction) of the three legs 210*a* to 210*c* that are configured by the E-type electrical steel sheet 110 and the longitudinal direction (Y-axis direction) of the yokes 220*a* and 220*b* that are configured by the E-type electrical steel sheet 110 coincide with any direction of the directions of easy magnetization 320*a* and 320*b* (in the example shown in FIG. 1 to FIG. 3, the direction of easy magnetization 320*a* or 320*b*) and the longitudinal direction (Y-axis direction) of the yokes 220*a* and 220*b* that are configured by the I-type electrical steel sheet 120 coincides with any direction of the directions of easy magnetization 320*a* and 320*b* (in the example shown in FIG. 1 to FIG. 3, the direction of easy magnetization 320*a*). In addition, the E-type electrical steel sheet 110 and the I-type electrical steel sheet 120 are combined such that the longitudinal direction of the legs 210*a* to 210*c* coincides with any direction of the directions of easy magnetization 320*a* and 320*b* (in the example shown in FIG. 1 to FIG. 3, the direction of easy magnetization 320*a*) and the longitudinal direction of the yokes 220*a* and 220*b* coincides with any direction of the directions of easy magnetization 320*a* and 320*b* (in the example shown in FIG. 1 to FIG. 3, the direction of easy magnetization 320*a* or 320*b*), thereby configuring the laminated core 100. Therefore, it is possible to realize the laminated core 100 and the electrical device 400 in which the characteristics of the non-oriented electrical steel sheet described in the section (electrical steel sheet used for laminated core) are effectively utilized.

In the present embodiment, a case where the E-type electrical steel sheets 110 and the I-type electrical steel sheets 120 are combined such that the directions in which the tip ends of the legs 210*a* to 210*c* that are configured by the E-type electrical steel sheet 110 are oriented become 180° opposite to each other alternately has been described as an example. In such a case, it is possible to prevent the boundaries between the E-type electrical steel sheets 110 and the I-type electrical steel sheets 120 from being present side by side in the lamination direction. Therefore, it is possible to reduce the iron loss or noise of the laminated core 100 and the like, which is preferable. However, it is not necessarily required to combine the E-type electrical steel sheets 110 and the I-type electrical steel sheets 120 as described above. The E-type electrical steel sheets 110 and the I-type electrical steel sheets 120 may be combined such that the directions in which the tip ends of the E-type electrical steel sheet 110 are oriented become the same. Even in such a case, as described above, it is preferable that the interval between the E-type electrical steel sheet 110 and the I-type electrical steel sheet 120 disposed in the same layer is short, and it is more preferable that the sheet thickness portions of the tip ends of the three legs 210*a* to 210*c* that are configured by the E-type electrical steel sheet 110 are in contact with the sheet thickness portions of the yokes 220*a* and 220*b* that are configured by the I-type electrical steel sheet 120 that are disposed in the same layer. However, in order to suppress the magnetic saturation of the laminated core, there is a case where a cavity is provided or an insulating material may be disposed between the sheet thickness portions of the tip ends of the three legs 210*a* to 210*c* that are configured by the E-type electrical steel sheet 110 and the sheet thickness portions of the yokes 220*a* and 220*b* that are configured by the I-type electrical steel sheet 120 that are disposed in the same layer.

In addition, in the present embodiment, a case where the electrical device 400 is a single-phase transformer has been described as an example. However, the electrical device 400 is not limited to a single-phase transformer as long as an electrical device has the laminated core 100 and a coil disposed so as to surround the laminated core 100. For example, the electrical device 400 may be a single-phase current transformer, may be a single-phase transformer, may be a reactor, may be a choke core, or may be another inductor. In addition, a power source for driving the electrical device 400 is not limited to a single-phase power source and may be, for example, a three-phase power source. In this case, in the above description, the expression 'single-phase' is replaced by the expression 'three-phase'. In addition, the coil is provided individually for each phase. For example, a coil may be disposed so as to surround each of the three legs 210*a* to 210*c* of the laminated core 100 to form an inner iron-type electrical device.

Second Embodiment

First, a second embodiment will be described. In the first embodiment, a case where the laminated core is an EI core has been described as an example. In contrast, in the present embodiment, a case where the laminated core is an EE core will be described as an example. As described above, the present embodiment and the first embodiment are mainly different in the electrical steel sheet that configures the laminated core. Therefore, in the description of the present embodiment, the same portions as in the first embodiment will be given the same reference numerals as the reference numerals in FIG. 1 to FIG. 4 and will not be described in detail.

Figure 5:
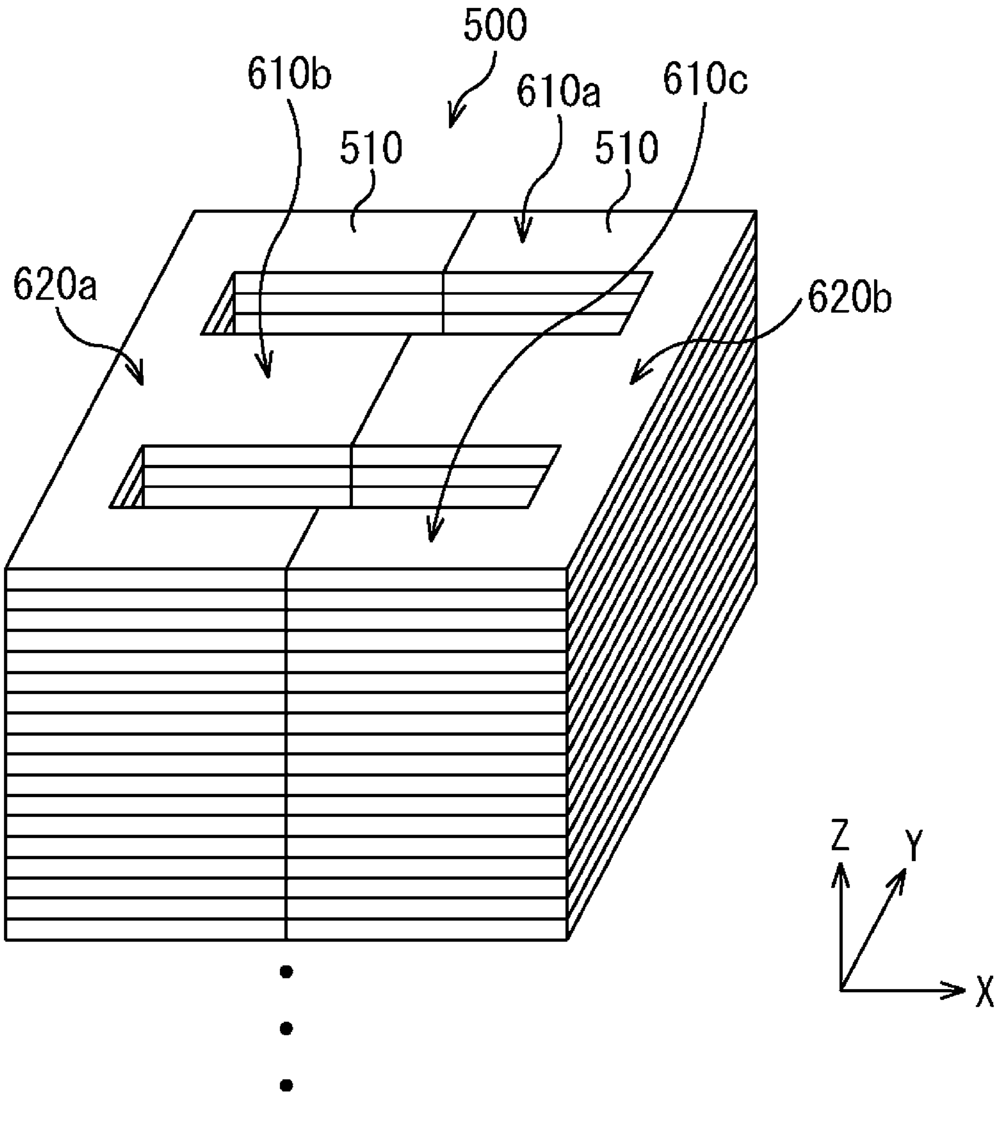
FIG. 5 is a view showing a second example of an external appearance configuration of a laminated core.
Figure 6:
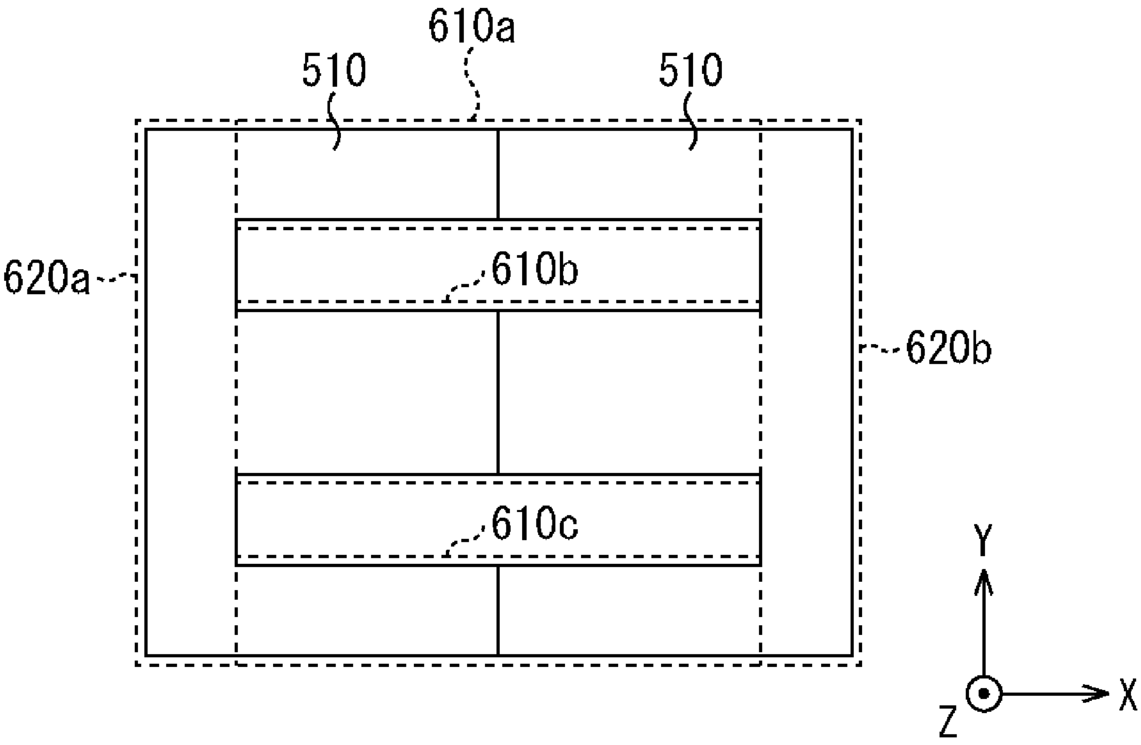
FIG. 6 is a view showing a second example of disposition of an electrical steel sheet in each layer of the laminated core.

FIG. 5 is a view showing an example of the external appearance configuration of a laminated core 500. FIG. 6 is a view showing an example of the disposition of electrical steel sheets in each layer of the laminated core 500.

In FIG. 5 and FIG. 6, the laminated core 500 has a plurality of E-type electrical steel sheets 510.

The laminated core 500 has three legs 610*a* to 610*c* that are disposed at intervals in the Y-axis direction, having the X-axis direction as the longitudinal direction, and two yokes 620*a* and 620*b* that are disposed at intervals in the X-axis direction, having the Y-axis direction as the longitudinal direction. One of the two yokes 620*a* and 620*b* is disposed at first ends of the three legs 610*a* to 610*c* in the longitudinal direction (X-axis direction). The other of the two yokes 620*a* and 620*b* is disposed at the other ends of the three legs 610*a* to 610*c* in the longitudinal direction (X-axis direction). The three legs 610*a* to 610*c* and the two yokes 620*a* and 620*b* are magnetically coupled. As shown in FIG. 6, the shape of the sheet surface in the same layer of the laminated core 500 becomes generally a squarish eight shape in which two letter Es are combined.

An E-type electrical steel sheet 510 configures halves of the legs in the longitudinal direction (X-axis direction) of the regions of the three legs 610*a* to 610*c* of the laminated core 500 and one of the two yokes 620*a* and 620*b* of the laminated core 500. That is, the lengths in the longitudinal direction of the three legs 610*a* to 610*c* that are configured by the E-type electrical steel sheet 510 are half the lengths in the longitudinal direction of the three legs 610*a* to 610*c* of the laminated core 500. In addition, as shown in FIG. 5 and FIG. 6, there is no boundary between the three legs 610*a* to 610*c* that are configured by the E-type electrical steel sheet 510 and the yokes 620*a* and 620*b* that are configured by the E-type electrical steel sheet 110.

In contrast, as shown in FIG. 5, there is a boundary at the positions of the tip ends of the three legs 610*a* to 610*c* that are configured by the E-type electrical steel sheets 510. That is, there is a boundary at the central positions in the longitudinal direction (X-axis direction) of the legs 610*a* to 610*c* of the laminated core 500. The intervals between the tip ends of the three legs 610*a* to 610*c* of the E-type electrical steel sheets 510 that are disposed in the same layer are preferably as short as possible. The sheet thickness portions of the tip ends of the three legs 610*a* to 610*c* that are configured by the E-type electrical steel sheets 510 that are disposed in the same layer are more preferably in contact with each other. However, in order to suppress the magnetic saturation of the laminated core 500, there is a case where a cavity is provided or an insulating material may be disposed between the sheet thickness portions of the tip ends of the three legs 610*a* to 610*c* that are configured by the E-type electrical steel sheets 510 that are disposed in the same layer.

The directions of easy magnetization of the E-type electrical steel sheet 510 coincide with two directions of the longitudinal direction (X-axis direction) of the three legs 610*a* to 610*c* that are configured by the E-type electrical steel sheet 510 and the longitudinal direction (Y-axis direction) of the yokes 620*a* and 620*b* that are configured by the E-type electrical steel sheet 110.

Figure 7:
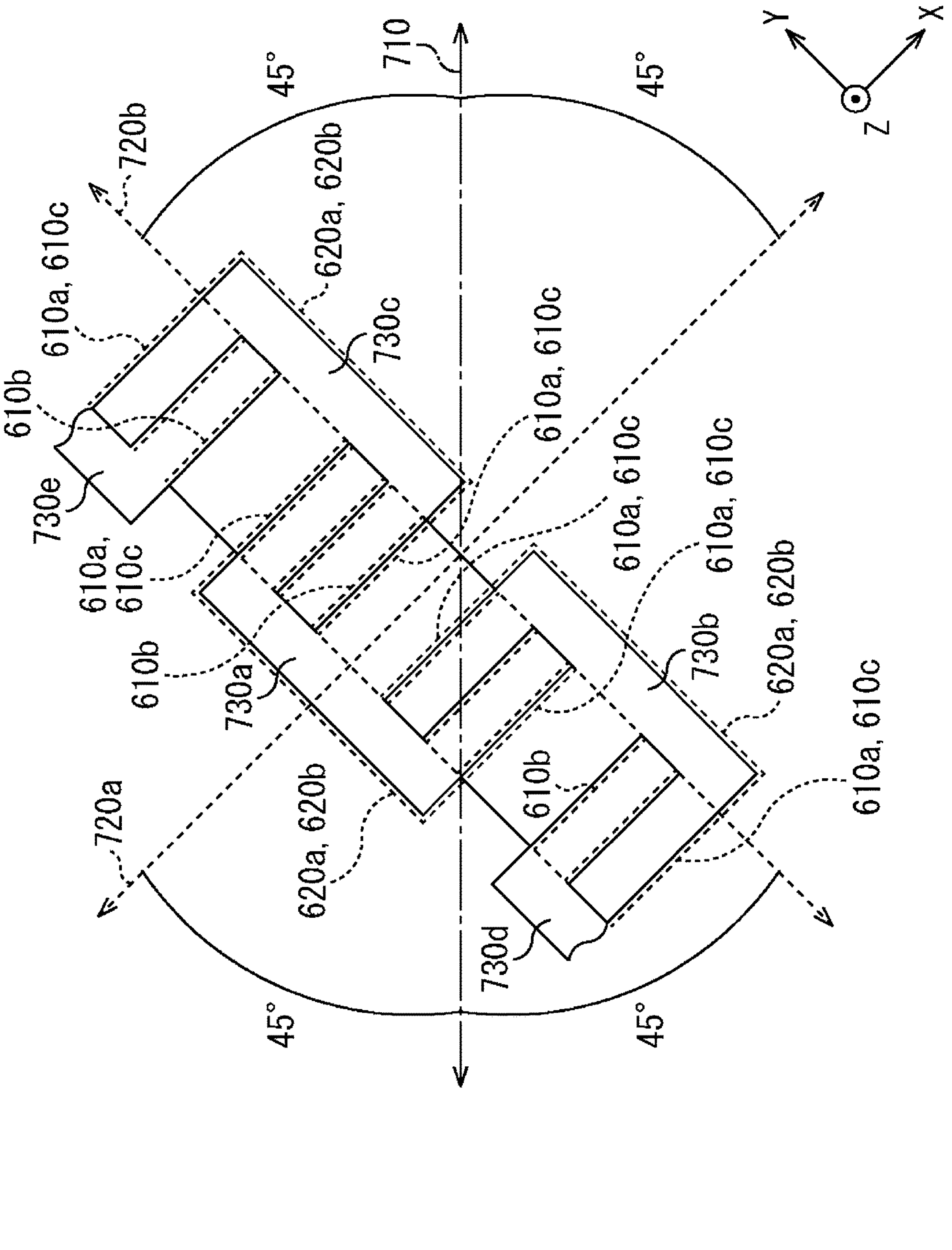
FIG. 7 is a view showing an example of a method of cutting out an E-type electrical steel sheet from an electrical steel strip.

FIG. 7 is a view showing an example of a method of cutting out the E-type electrical steel sheet 510 from an electrical steel strip.

In FIG. 7, an imaginary line 710 indicated by an alternate long and short dash line indicates a rolling direction of the electrical steel strip (hereinafter, also referred to as the rolling direction 710). Imaginary lines 720*a* and 720*b* indicated by broken lines indicate the directions of easy magnetization of the electrical steel strip (hereinafter, also referred to as the directions of easy magnetization 720*a* and 720*b*). In FIG. 7, directions parallel to the imaginary line 710 are all the rolling direction of the electrical steel strip, and directions parallel to the imaginary lines 720*a* and 720*b* are all the directions of easy magnetization of the electrical steel strip. In addition, in FIG. 7, for ease of description, the legs 610*a* to 610*c* and the yokes 620*a* and 620*b* corresponding to the cut-out electrical steel sheet are shown together.

As described above, two directions at an angle of 45° with respect to the rolling direction 710 are the directions of easy magnetization.

In the example shown in FIG. 7, regions 730*a* to 730*e* that configure the E-type electrical steel sheet 510 are cut out from the electrical steel strip such that the longitudinal direction of the three legs 610*a* to 610*c* that are configured by the E-type electrical steel sheet 510 coincides with one direction of easy magnetization 720*a* of the two directions of easy magnetization 720*a* and 720*b* of the electrical steel strip and the longitudinal direction of the yokes 620*a* and 620*b* that are configured by the E-type electrical steel sheet 510 coincides with the other direction of easy magnetization 720*b* of the two directions of easy magnetization 720*a* and 720*b* of the electrical steel strip. In FIG. 7, the solid lines indicate cut-out positions. For ease of expression, in FIG. 7, a part of the regions 730*d* to 730*e* that configure the E-type electrical steel sheet 510 is not shown.

In the example shown in FIG. 7, the regions 730*a* to 730*e* that configure the E-type electrical steel sheet 510 are cut out from the electrical steel strip such that the leg positioned at first ends of the three legs 610*a* to 610*c* that are configured the E-type electrical steel sheet 510 is positioned between the two legs 610*a* and 610*b* or 610*b* and 610*c* adjacent to each other of the three legs that are configured by a different E-type electrical steel sheet 510 that is different from the above-described E-type electrical steel sheet 510.

As described above, when the regions between the three legs 610*a* to 610*c* that are configured by the E-type electrical steel sheet 510 are used as the legs at the ends of the three legs 610*a* to 610*c* that are configured by a different E-type electrical steel sheet 510 that is different from the above-described E-type electrical steel sheet 510, it is possible to reduce regions in the region of the electrical steel strip that do not become the E-type electrical steel sheet 510.

In a case where the intervals (in the Y-axis direction) between the two legs 610*a* and 610*b* and 610*b* and 610*c* adjacent to each other of the three legs 610*a* to 610*c* that are configured by the E-type electrical steel sheet 510 are the same as the widths (lengths in the Y-axis direction) of the legs 610*a* and 610*c* not positioned at the center of the three legs 610*a* to 610*c* that are configured by the E-type electrical steel sheet 510, a process for adjusting the widths of the legs 610*a* and 610*c* not positioned at the center of the three legs 610*a* to 610*c* that are configured by the E-type electrical steel sheet 510 becomes unnecessary. In this case, the regions between the three legs 610*a* to 610*c* that are configured by the E-type electrical steel sheet 510 can be used without waste as the legs at the ends of the three legs 610*a* to 610*c* that are configured by a different E-type electrical steel sheet 510 that is different from the above-described E-type electrical steel sheet 510.

FIG. 7 shows only an appearance in which five E-type electrical steel sheets 510 are cut out; however, when the regions 730*a* to 730*e* shown in FIG. 7 are continuously provided side by side, it is possible to cut out a large number of E-type electrical steel sheets 510 from the electrical steel strip. When the E-type electrical steel sheets 510 are cut out as shown in FIG. 7, it is possible to reduce the regions that do not become the E-type electrical steel sheets 510, which is preferable. However, it is not necessarily required to cut out the E-type electrical steel sheets 510 as shown in FIG. 7. For example, in a case where the legs 610*a* and 610*c* are not positioned at the center of the three legs 610*a* to 610*c* that are configured by the E-type electrical steel sheet protrude from the regions between the two legs 610*a* and 610*b* and 610*b* and 610*c* adjacent to each other of the three legs 610*a* to 610*c* that are configured by the E-type electrical steel sheet, the regions between the two legs 610*a* and 610*b* and 610*b* and 610*c* adjacent to each other of the three legs 610*a* to 610*c* that are configured by the E-type electrical steel sheet are not used as a different E-type electrical steel sheet that is different from the above-described E-type electrical steel sheet.

Layers obtained by combining two E-type electrical steel sheets 510 obtained as described above such that the tip ends of the legs 610*a* to 610*c* of the electrical steel sheets 510 face each other to form a squarish eight shape as a whole are stacked such that the contours of the squarish eight shapes are matched to each other, whereby the laminated core 500 is configured.

An electrical device configured using the laminated core 500 is realized using the laminated core 500 of the present embodiment instead of the laminated core 100 in the electrical device 400 of the first embodiment. However, in the present embodiment, when the laminated core 500 is configured, two sets of the plurality of E-type electrical steel sheets 510 stacked such that the contours are matched to each other are prepared such that the length in the lamination direction (height direction, Z-axis direction) becomes the same as the length of the laminated core 500 in the lamination direction. In the following description, the two sets of the plurality of E-type electrical steel sheets 510 stacked as described above will be referred to as the E-type electrical steel sheet group as necessary.

As described in the first embodiment, the primary coil 410 and the secondary coil 420 are disposed as shown in FIG. 4, and then the central legs 610*b* of the E-type electrical steel sheet group are inserted into the hollow portion of the primary coil 410 such that the directions in which the tip ends of the legs 610*a* to 610*c* of two sets of the E-type electrical steel sheet groups are oriented become 180° opposite to each other. In such a case, the shape of the sheet surface in the same layer becomes a squarish eight shape in which two letter Es are combined.

In addition, as described in the section (electrical steel sheet used for laminated core), stress relief annealing is performed on the laminated core 500.

As described above, in the present embodiment, the E-type electrical steel sheets 510 are configured such that two directions of the longitudinal direction (X-axis direction) of the three legs 610*a* to 610*c* that are configured by the E-type electrical steel sheet 510 and the longitudinal direction (Y-axis direction) of the yokes 620*a* and 620*b* that are configured by the E-type electrical steel sheet 510 coincide with any direction of the directions of easy magnetization 720*a* and 720*b* (in the example shown in FIG. 5 to FIG. 7, the direction of easy magnetization 720*a* or 720*b*). In addition, the E-type electrical steel sheets 510 are combined such that the longitudinal direction of the legs 610*a* to 610*c* coincides with any direction of the directions of easy magnetization 720*a* and 720*b* (in the example shown in FIG. 5 to FIG. 7, the direction of easy magnetization 720*a*) and the longitudinal direction of the yokes 620*a* and 620*b* coincides with any direction of the directions of easy magnetization 720*a* and 720*b* (in the example shown in FIG. 5 to FIG. 7, the direction of easy magnetization 720*b*), thereby configuring the laminated core 500. Therefore, even when the laminated core is the EE core, the same effect as in a case where the laminated core is the EI core can be exhibited.

In the present embodiment as well, a variety of modification examples described in the first embodiment can be employed.

Third Embodiment

Next, a third embodiment will be described. In the first embodiment, the laminated core is the EI core, and in the second embodiment, a case where the laminated core is the EE core has been described as an example. In contrast, in the present embodiment, a case where the laminated core is a UI core will be described as an example. As described above, the present embodiment and the first and second embodiments are mainly different in the electrical steel sheet that configures the laminated core. Therefore, in the description of the present embodiment, the same portions as in the first and second embodiments will be given the same reference numerals as the reference numerals in FIG. 1 to FIG. 7 and will not be described in detail.

Figure 8:
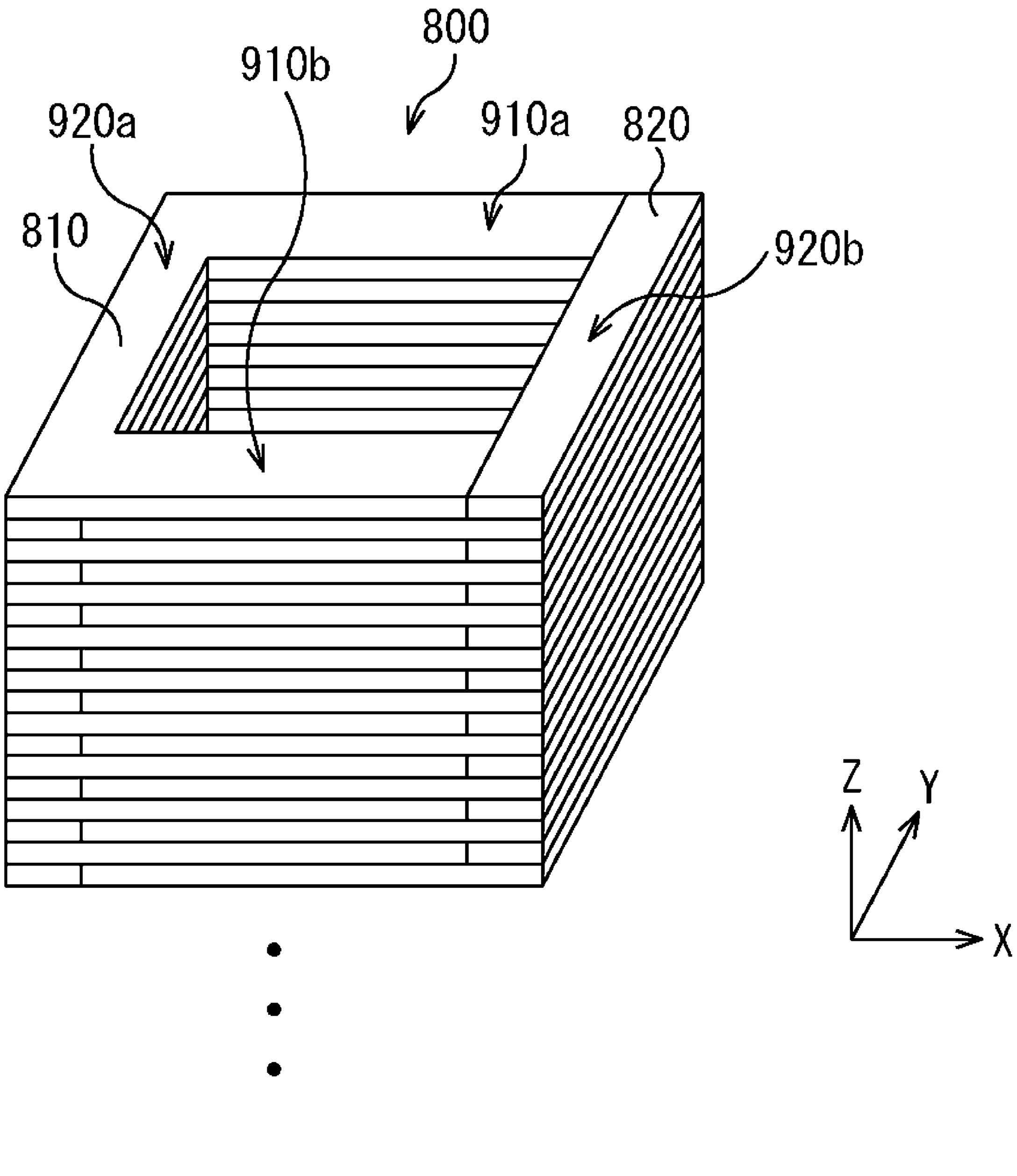
FIG. 8 is a view showing a third example of an external appearance configuration of a laminated core.
Figure 9:
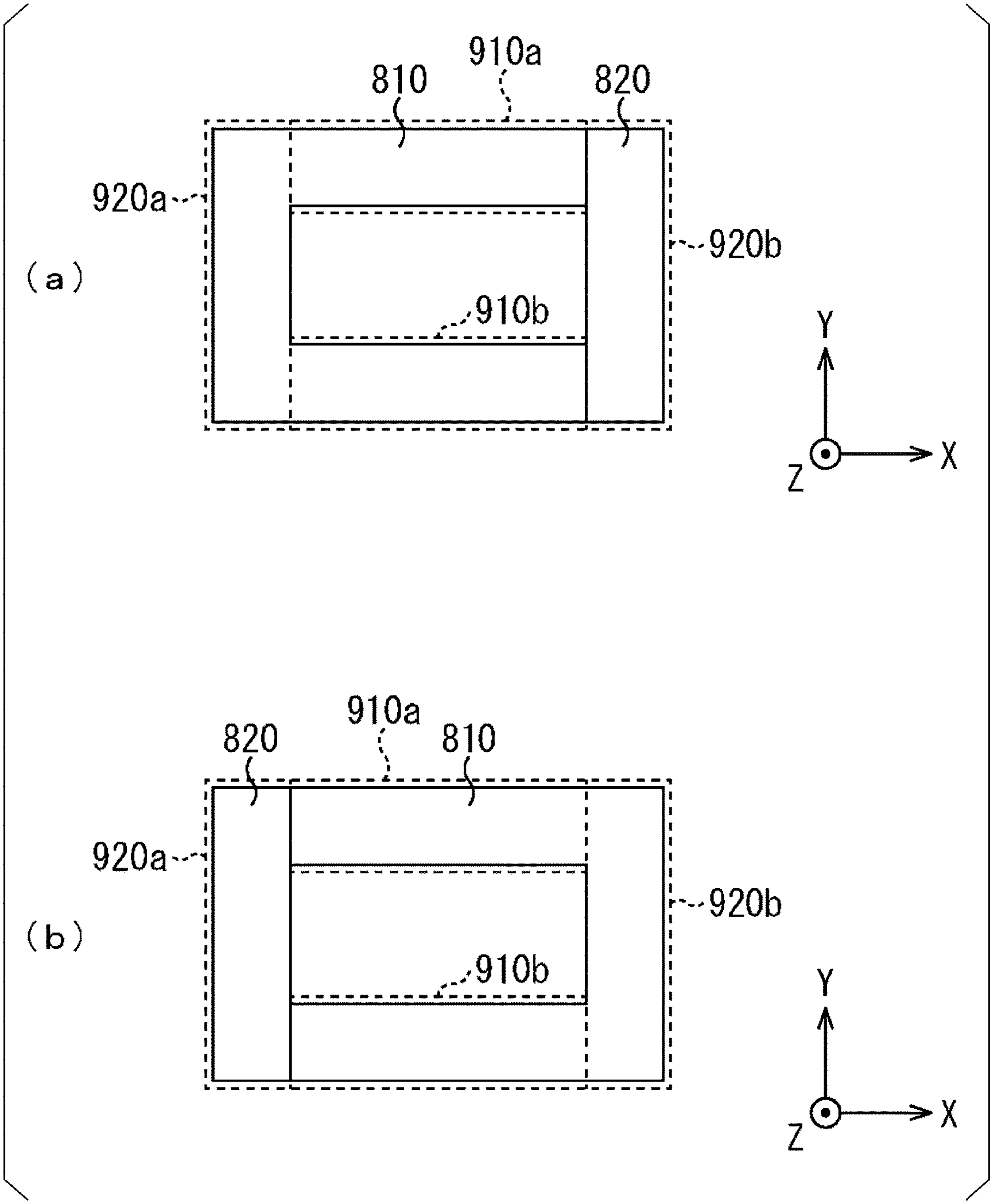
FIG. 9 is a view showing a third example of disposition of an electrical steel sheet in each layer of the laminated core.

FIG. 8 is a view showing an example of the external appearance configuration of a laminated core 800. FIG. 9 is a view showing an example of the disposition of electrical steel sheets in each layer of the laminated core 800. FIG. 9(*a*) is a view showing an example of the disposition of odd-numbered electrical steel sheets from the top (counted from the positive direction side of the Z axis). FIG. 9(*b*) is a view showing an example of the disposition of even-numbered electrical steel sheets from the top. In FIG. 9, for ease of description, the legs 810*a* and 810*b* and the yokes 820*a* and 820*b* corresponding to the cut-out electrical steel sheet are shown together.

In FIG. 8 and FIG. 9, the laminated core 800 has a plurality of U-type electrical steel sheets 810 and a plurality of I-type electrical steel sheets 820.

The laminated core 800 has two legs 910*a* to 910*c* that are disposed at intervals in the Y-axis direction, having the X-axis direction as the longitudinal direction, and two yokes 920*a* and 920*b* that are disposed at intervals in the X-axis direction, having the Y-axis direction as the longitudinal direction. One of the two yokes 920*a* and 920*b* is disposed at first ends of the two legs 910*a* and 910*b* in the longitudinal direction (X-axis direction). The other of the two yokes 920*a* and 920*b* is disposed at the other ends of the two legs 910*a* and 910*b* in the longitudinal direction (X-axis direction). The two legs 910*a* and 910*b* and the two yokes 920*a* and 920*b* are magnetically coupled. As shown in FIG. 9(*a*) and FIG. 9(*b*), the shape of the sheet surface in the same layer of the laminated core 800 is generally a square shape in which a letter U and a letter I are combined.

A U-type electrical steel sheet 810 configures the two legs 910*a* and 910*b* of the laminated core 800 and one of the two yokes 920*a* and 920*b* of the laminated core 800. There is no boundary between the two legs 910*a* and 910*b* that are configured by the U-type electrical steel sheet 810 and the yokes 920*a* and 920*b* that are configured by the U-type electrical steel sheet 810. An I-type electrical steel sheet 820 configures one of the two yokes of the laminated core 800. There is a boundary between the yokes 920*a* and 920*b* that are configured by the I-type electrical steel sheet 820 and the two legs 910*a* and 910*b* that are configured by the U-type electrical steel sheet 810.

The interval between the U-type electrical steel sheet 810 and the I-type electrical steel sheet 820 that are disposed in the same layer is preferably as short as possible. The sheet thickness portions of the tip ends of the two legs 910*a* and 910*b* that are configured by the U-type electrical steel sheet 810 and the sheet thickness portions of the yokes 920*a* and 920*b* that are configured by the I-type electrical steel sheet 820, which are disposed in the same layer, are more preferable in contact with each other.

The directions of easy magnetization of the U-type electrical steel sheet 810 coincide with two directions of the longitudinal direction (X-axis direction) of the two legs 910*a* and 910*b* that are configured by the U-type electrical steel sheet 810 and the longitudinal direction (Y-axis direction) of the yokes 920*a* and 920*b* that are configured by the U-type electrical steel sheet 810.

The direction of easy magnetization of the I-type electrical steel sheet 820 coincides with the longitudinal direction (Y-axis direction) of the yokes 920*a* and 920*b* that are configured by the I-type electrical steel sheet 820.

Figure 10:
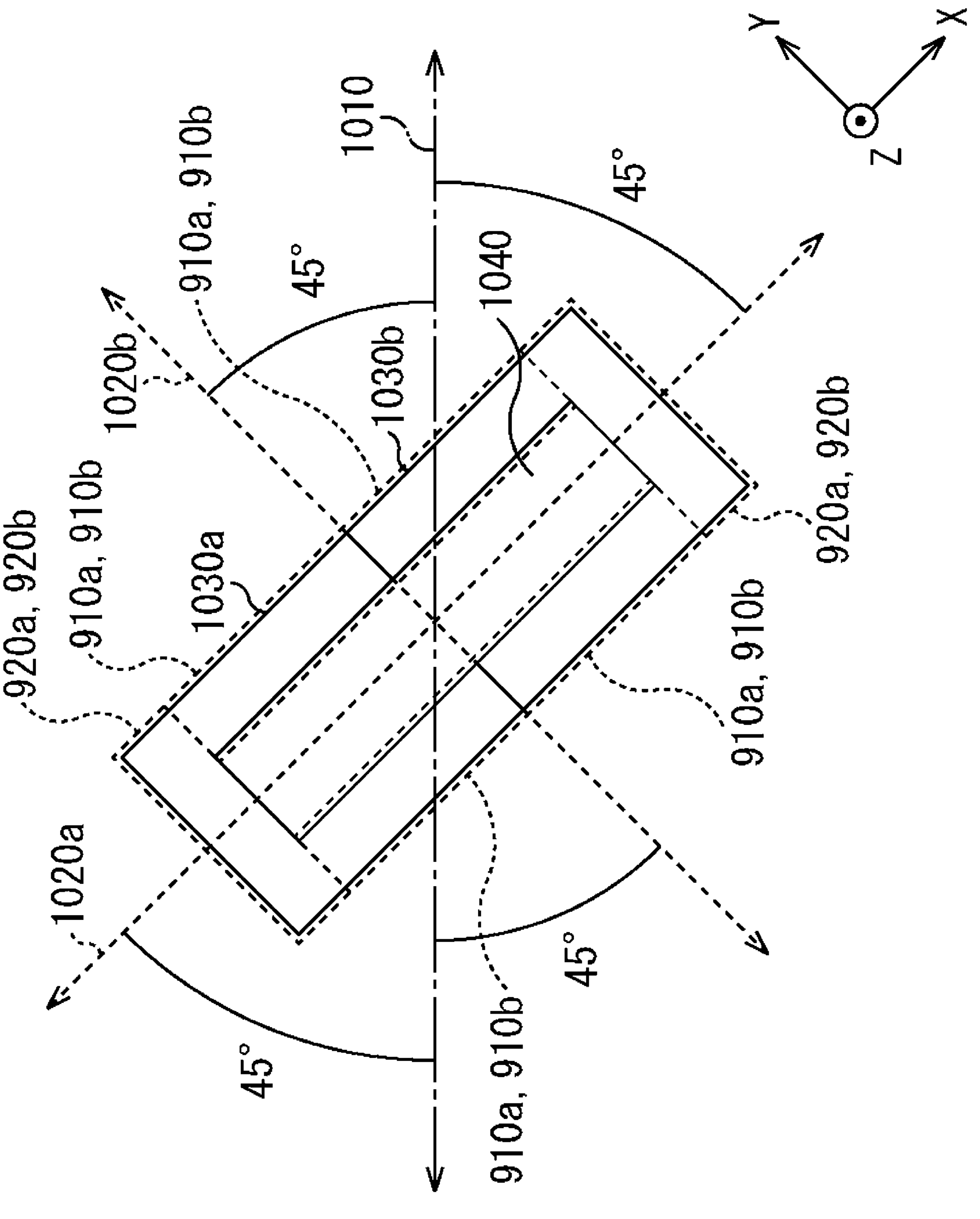
FIG. 10 is a view showing an example of a method for cutting out a U-type electrical steel sheet and an I-type electrical steel sheet from an electrical steel strip.

FIG. 10 is a view showing an example of a method for cutting out a U-type electrical steel sheet 810 and an I-type electrical steel sheet 820 from an electrical steel strip.

In FIG. 10, an imaginary line 1010 indicated by an alternate long and short dash line indicates a rolling direction of the electrical steel strip (hereinafter, also referred to as the rolling direction 1010). Imaginary lines 1020*a* and 1020*b* indicated by broken lines indicate the directions of easy magnetization of the electrical steel strip (hereinafter, also referred to as the directions of easy magnetization 1020*a* and 1020*b*). In FIG. 10, directions parallel to the imaginary line 1010 are all the rolling direction of the electrical steel strip, and directions parallel to the imaginary lines 1020*a* and 1020*b* are all the directions of easy magnetization of the electrical steel strip.

As described above, two directions at an angle of 45° with respect to the rolling direction 1010 are the directions of easy magnetization.

In the example shown in FIG. 10, regions 1030*a* and 1030*b* that configure the U-type electrical steel sheet 810 are cut out from the electrical steel strip such that the longitudinal direction of the two legs 910*a* and 910*b* that are configured by the U-type electrical steel sheet 810 coincides with one direction of easy magnetization 1020*a* of the two directions of easy magnetization 1020*a* and 1020*b* of the electrical steel strip and the longitudinal direction of the yokes 920*a* and 920*b* that are configured by the U-type electrical steel sheet 810 coincides with the other direction of easy magnetization 1020*b* of the two directions of easy magnetization 1020*a* and 1020*b* of the electrical steel strip. In FIG. 10, the solid lines indicate cut-out positions.

In the example shown in FIG. 10, the regions 1030*a* and 1030*b* that configure the two U-type electrical steel sheets 810 are cut out from the electrical steel strip such that the tip ends of the two legs 910*a* and 910*b* that are configured by the two U-type electrical steel sheets 810 meet each other.

In addition, when the regions 1030*a* and 1030*b* that configure the two U-type electrical steel sheets 810 are cut out from the electrical steel strip such that the tip ends of the two legs 910*a* and 910*b* meet each other, an I-shaped region 1040 between the two legs 910*a* and 910*b* that are configured by the two U-type electrical steel sheets 810 are also cut out. The longitudinal direction of the I-shaped region 1040 coincides with one direction of easy magnetization 1020*a* of the two directions of easy magnetization 1020*a* and 1020*b* of the electrical steel strip. Therefore, in the present embodiment, the I-type electrical steel sheets 820 are formed using the I-shaped region 1040.

In a case where the interval (in the Y-axis direction) of the two legs 910*a* and 910*b* that are configured by the U-type electrical steel sheet 810 is twice the length of the I-type electrical steel sheet 820 in the width direction (Y-axis direction), it is possible to determine the region of the I-type electrical steel sheets 820 in the width direction by cutting the I-shaped region 1040 at the central position in the width direction (Y-axis direction). In addition, in a case where the lengths in the longitudinal direction (X-axis direction) of the two legs 910*a* and 910*b* that are configured by the U-type electrical steel sheet 810 are the same as the length of the I-type electrical steel sheet 820 in the longitudinal direction (X-axis direction), it is possible to determine the region of the I-type electrical steel sheet 820 in the longitudinal direction by cutting the I-shaped region 1040 at the central position in the longitudinal direction (X-axis direction).

As described above, when the region between the two legs 910*a* and 910*b* that are configured by the U-type electrical steel sheet 810 is used as the I-type electrical steel sheet 820, it is possible to reduce regions in the region of the electrical steel strip that become neither the U-type electrical steel sheet 810 nor the I-type electrical steel sheet 820.

The interval (in the Y-axis direction) between the two legs 910*a* and 910*b* that are configured by the U-type electrical steel sheet 810 are set to be twice the length in the width direction (Y-axis direction) of the I-type electrical steel sheet 820, and the lengths in the longitudinal direction (X-axis direction) of the two legs 910*a* and 910*b* that are configured by the U-type electrical steel sheet 810 are set to be the same as the length of the I-type electrical steel sheet 820 in the longitudinal direction (X-axis direction). In this case, the regions 1030*a* and 1030*b* that configure the two U-type electrical steel sheets 810 are cut out from the electrical steel strip such that the tip ends of the two legs 910*a* and 910*b* meet each other, and the I-shaped region 1040 between the two legs 910*a* and 910*b* is cut at the central position in the longitudinal direction (X-axis direction) and in the width direction (Y-axis direction) into four pieces, whereby two U-type electrical steel sheets 810 are formed, and four I-type electrical steel sheets 820 are formed. In this case, the region between the two legs 910*a* to 910*c* that are configured by the U-type electrical steel sheet 810 can be used as the I-type electrical steel sheets 820 without waste.

FIG. 10 shows only an appearance in which two U-type electrical steel sheets 810 are cut out and four I-type electrical steel sheets 820 are cut out. However, when the regions 1030*a* and 1030*b* shown in FIG. 10 are continuously provided side by side, it is possible to cut out a large number of U-type electrical steel sheets 810 and a large number of I-type electrical steel sheets 820 from the electrical steel strip. When the U-type electrical steel sheets 810 and the I-type electrical steel sheets 820 are cut out as shown in FIG. 10, it is possible to reduce the regions that become neither the U-type electrical steel sheet 810 nor the I-type electrical steel sheet 820, which is preferable. However, it is not necessarily required to cut out the U-type electrical steel sheets 810 and the I-type electrical steel sheets 820 as shown in FIG. 10. For example, in a case where the I-type electrical steel sheet protrudes from the regions between the two legs 910*a* and 910*b* that are configured by the U-type electrical steel sheet, the I-type electrical steel sheets are cut out from a region different from the regions of the electrical steel strip.

Layers obtained by combining the (one) U-type electrical steel sheet 810 and the (one) I-type electrical steel sheet 820 obtained as described above to form a square shape as a whole are stacked such that the contours of the square shapes are matched to each other, whereby the laminated core 800 is configured. At this time, the U-type electrical steel sheets 810 and the I-type electrical steel sheets 820 are combined such that the directions in which the tip ends of the legs 910*a* and 910*b* that are configured by the U-type electrical steel sheet 810 are oriented become 180° opposite to each other alternately. In the example shown in FIG. 8 and FIG. 9, the tip ends of the legs 910*a* and 910*b* that are configured by the U-type electrical steel sheet 810 are oriented toward the positive direction side of the X axis in the odd-numbered layers from the top, and the tip ends of the legs 910*a* and 910*b* that are configured by the U-type electrical steel sheet 810 are oriented toward the negative direction side of the X axis in the even-numbered layers from the top.

Figure 11:
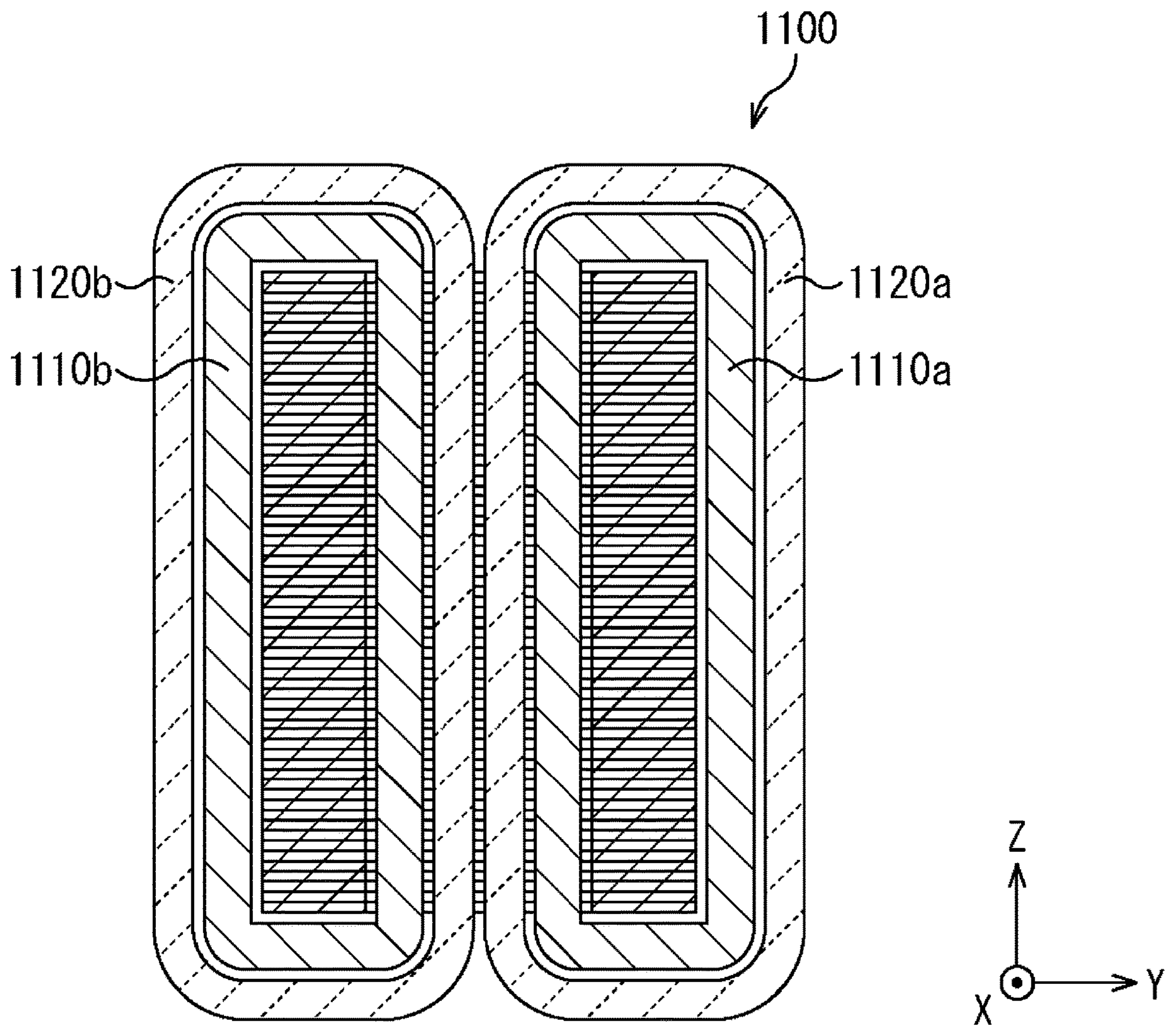
FIG. 11 is a view showing a third example of the configuration of an electrical device.

FIG. 11 is a view showing an example of the configuration of an electrical device configured using the laminated core 800. In the present embodiment, similar to the first embodiment, a case where an electrical device 1100 is a single-phase transformer will be described as an example. FIG. 11 shows a cross section of the laminated core 800 in the case of being cut at the center of the legs 910*a* and 910*b* that are configured by the laminated core 800 in the longitudinal direction (X-axis direction) parallel to the longitudinal direction (Y-axis direction) of the yokes 920*a* and 920*b* that are configured by the laminated core 800 and the lamination direction (Z-axis direction). In FIG. 11, for ease of description and expression, a part of the configuration of the electrical device 1100 is simplified or omitted.

In FIG. 11, the electrical device 1100 has the laminated core 800, primary coils 1110*a* and 1110*b*, and secondary coils 1120*a* and 1120*b*.

The primary coils 1110*a* and 1110*b* are connected in series or in parallel. An input voltage (excitation voltage) is applied to both ends of the primary coils 1110*a* and 1110*b* connected in series or in parallel. The secondary coils 1120*a* and 1120*b* are connected in series or in parallel. An output voltage corresponding to the turn ratio between the primary coils 1110*a* and 1110*b* connected in series or in parallel and the secondary coils 1120*a* and 1120*b* connected in series or in parallel is output at both ends of the secondary coils 1120*a* and 1120*b* connected in series or in parallel.

The primary coil 1110*a* is disposed so as to surround (the side surfaces of) one leg 910*a* of the two legs 910*a* and 910*b* of the laminated core 800. The primary coil 1110*a* is electrically insulated from the laminated core 800 and the secondary coils 1120*a* and 1120*b*. The primary coil 1110*b* is disposed so as to surround (the side surfaces of) the other leg 910*b* of the two legs 910*a* to 910*b* of the laminated core 800. The primary coil 1110*b* is electrically insulated from the laminated core 800 and the secondary coils 1120*a* and 1120*b*. The secondary coil 1120*a* is disposed outside the primary coil 1110*a* so as to surround (the side surface of) one leg 910*a* of the two legs 910*a* and 910*b* of the laminated core 800. The secondary coil 1120*a* is electrically insulated from the laminated core 800 and the primary coils 1110*a* and 1110*b*. The secondary coil 1120*b* is disposed outside the primary coil 1110*b* so as to surround (the side surface of) the other leg 910*b* of the two legs 910*a* and 910*b* of the laminated core 800. The secondary coil 1120*b* is electrically insulated from the laminated core 800 and the primary coils 1110*a* and 1110*b*.

The total value of the thickness of the primary coils 1110*a* and 1110*b* and the thicknesses of the secondary coils 1120*a* and 1120*b* is smaller than the interval (in the Y-axis direction) between the two legs of the laminated core 800.

At the time of configuring the electrical device 1100, first, the primary coils 1110*a* and 1110*b* and the secondary coils 1120*a* and 1120*b* are produced. In addition, the primary coils 1110*a* and 1110*b* and the secondary coils 1120*a* and 1120*b* are disposed as shown in FIG. 11. Specifically, the primary coil 1110*a* and the secondary coil 1120*a* are disposed such that the primary coil 1110*a* is present relatively inside, the secondary coil 1120*a* is present relatively outside, and the primary coil 1110*a* and the secondary coil 1120*a* are concentric with each other. Similarly, the primary coil 1110*b* and the secondary coil 1120*b* are disposed such that the primary coil 1110*b* is present relatively inside, the secondary coil 1120*b* is present relatively outside, and the primary coil 1110*b* and the secondary coil 1120*b* are concentric with each other.

After that, one or the other legs 910*a* and 910*b* that are configured by the U-type electrical steel sheets 810 are each sequentially inserted into hollow portions of the primary coils 1110*a* and 1110*b* respectively such that the directions in which the tip ends of the legs 910*a* and 910*b* that are configured by the U-type electrical steel sheets 810 are oriented become 180° opposite to each other alternately, and the I-type electrical steel sheets 820 are disposed at the tip ends of the legs 910*a* and 910*b* that are configured by the U-type electrical steel sheets 810 such that the shape of the sheet surface becomes a square shape in which a letter U and a letter I are combined in the same layer. The U-type electrical steel sheets 810 and the I-type electrical steel sheets 820 are disposed as described above, whereby the laminated core 800 in a state where the primary coil 1110*a*, the secondary coil 1120*a* and the primary coil 1110*b* and the secondary coil 1120*b* are disposed in one or the other legs respectively that are configured by the U-type electrical steel sheets 810 is configured. In such a case, it becomes unnecessary to pass electric wires that configure the primary coils 1110*a* and 1110*b* and the secondary coils 1120*a* and 1120*b* through the region between the two legs 910*a* and 910*b* of the laminated core 800 in each coiling. Therefore, it is possible to easily configure the primary coils 1110*a* and 1110*b* and the secondary coils 1120*a* and 1120*b*.

The laminated core 800 can be fixed by a well-known method as described in the first embodiment. In addition, as described in the section (electrical steel sheet used for laminated core), stress relief annealing is performed on the laminated core 800.

As described above, in the present embodiment, the U-type electrical steel sheet 810 and the I-type electrical steel sheet 820 are configured such that two directions of the longitudinal direction (X-axis direction) of the two legs 910*a* and 910*b* that are configured by the U-type electrical steel sheet 810 and the longitudinal direction (Y-axis direction) of the yokes 920*a* and 920*b* that are configured by the U-type electrical steel sheet 810 coincide with any direction of the directions of easy magnetization 1020*a* and 1020*b* (in the example shown in FIG. 8 to FIG. 10, the direction of easy magnetization 1020*a* or 1020*b*) and the longitudinal direction (Y-axis direction) of the yokes 920*a* and 920*b* that are configured by the I-type electrical steel sheet 820 coincides with any direction of the directions of easy magnetization 1020*a* and 1020*b* (in the example shown in FIG. 8 to FIG. 10, the direction of easy magnetization 1020*a*). In addition, the U-type electrical steel sheet 810 and the I-type electrical steel sheet 820 are combined such that the longitudinal direction of the legs 910*a* and 910*b* coincides with any direction of the directions of easy magnetization 1020*a* and 1020*b* (in the example shown in FIG. 8 to FIG. 10, the direction of easy magnetization 1020*a*) and the longitudinal direction of the yokes 920*a* and 920*b* coincides with any direction of the directions of easy magnetization 1020*a* and 1020*b* (in the example shown in FIG. 8 to FIG. 10, the direction of easy magnetization 1020*a* or 1020*b*), thereby configuring the laminated core 800. Therefore, even when the laminated core is the UI core, the same effect as in a case where the laminated core is the EI core or the EE core can be exhibited.

In the present embodiment, a case where the coils (the primary coils 1110*a* and 1110*b* and the secondary coils 1120*a* and 1120*b*) are disposed in each of the two legs 910*a* to 910*b* of the laminated core 800 has been described as an example. However, it is not necessarily required to dispose the coils in each of the two legs 910*a* to 910*b* of the laminated core 800 as described above. For example, the coils may be disposed in one of the two legs 910*a* to 910*b* of the laminated core 800, and no coils may be disposed on the other leg. In addition, the electrical device may be an shell type electrical device using two laminated cores 800. In such a case, the coils are disposed in the hollow portions of the two laminated cores 800.

In the present embodiment, the corner portions of the U-type electrical steel sheet 810 are at right angles (bent) and are not strictly U-shaped, but such a shape is also regarded as a U shape (a shape having curvature at each corner portion (being bent) is also regarded as a U shape).

In addition, in the present embodiment as well, a variety of modification examples described in the first and second embodiments can be employed.

The configuration of the laminated core is not limited to the EI core, the EE core, and the UI core described in the first to third embodiments. The laminated core may be any laminated core as long as a plurality of legs and a plurality of yokes are provided and at least a partial region of the plurality of legs and at least a partial region of the plurality of yokes are configured by the same (one) electrical steel sheet at the same position in the lamination direction of electrical steel sheets. That is, the laminated core simply needs to be formed of an electrical steel sheet that can be evaluated as having the same characteristics such as a case where at least a part of each of the leg and the yoke that extend orthogonal to each other at each position in the lamination direction is cut out from, for example, the same electrical steel strip. Specifically, as long as manufacturing conditions that can affect the characteristics of the electrical steel sheet such as rolling conditions or cooling conditions that are set in each facility at the time of manufacturing the electrical steel strip are the same, each electrical steel strip can be evaluated as having the same characteristics. That is, in each electrical steel sheet, at least a partial region of the plurality of legs and at least a partial region of the plurality of yokes are manufactured under the same manufacturing conditions at the same position (each position) in the lamination direction of the electrical steel sheets in the laminated core. In this electrical steel sheet, when any direction of two directions in which the magnetic characteristics of the electrical steel sheet are most excellent is along any of the extension direction of the leg and the extension direction of the yoke, a laminated core having improved magnetic characteristics is manufactured.

Here, the plurality of yokes are disposed in a direction perpendicular to the extension direction of the legs as the extension direction such that a closed magnetic circuit is formed in the laminated core when the laminated core is excited. In addition, the electrical steel sheets are laminated such that the sheet surfaces face each other. In such a laminated core, there is no boundary in the region that is configured by the same electrical steel sheet at the same position in the lamination direction of the electrical steel sheets (between at least a partial region of the legs and at least a partial region of the yokes), and the region has become one continuous region. In addition, the direction in which the main magnetic flux flows inside the laminated core when the laminated core is excited includes the extension direction of the leg and the extension direction of the yoke.

For example, in the first to third embodiments, cases where, in the same layer (the position having the same lamination direction), the mutually facing surfaces of two electrical steel sheets (the E-type electrical steel sheets 110, the I-type electrical steel sheets 120, the E-type electrical steel sheets 510, the E-type electrical steel sheets 510, the U-type electrical steel sheets 810, and the I-type electrical steel sheets 820) are surfaces (Y-Z plane) in a direction perpendicular to the longitudinal direction of the leg that is configured by at least one electrical steel sheet of the two electrical steel sheets have been described as examples. However, in the same layer, as long as the mutually facing surfaces of the two electrical steel sheets are parallel to each other, the surfaces are not necessarily required to be the surfaces (Y-Z plane) in a direction perpendicular to the longitudinal direction of the leg that is configured by at least one electrical steel sheet of the two electrical steel sheets and may be surfaces in an inclined direction with respect to the above-described direction (for example, in FIG. 2, the boundary line between the E-type electrical steel sheet 110 and the I-type electrical steel sheet 120 may be inclined with respect to the Y axis).

In addition, in the second embodiment, the case where the EE core is configured using two sets of the E-type electrical steel sheet groups having the same shape and size has been described as an example. However, the lengths of the legs of the two sets of E-type electrical steel sheet groups may be different.

In addition, the laminated core may be a UU core. In this case, for example, two sets of U-type electrical steel sheet groups in which a plurality of the U-type electrical steel sheets 810 are stacked such that the contours are matched to each other are prepared, and the two sets of the U-type electrical steel sheet groups are disposed such that the directions in which the tip ends of the legs of the two sets of the electrical steel sheet groups are oriented become 180° opposite to each other. In addition, in a case where the laminated core is the UT core as well, the lengths of the legs of the two sets of the electrical steel sheet groups may be different from each other as in the case where the EE core has been described.

In addition, in the first to third embodiments, cases where, in the same layer (the position having the same lamination direction), two electrical steel sheets (the E-type electrical steel sheets 110, the I-type electrical steel sheets 120, the E-type electrical steel sheets 510, the E-type electrical steel sheets 510, the U-type electrical steel sheets 810, and the I-type electrical steel sheets 820) are combined to configure the laminated cores 100, 500, and 800 have been described as examples. However, a laminated core may be formed by combining three electrical steel sheets in the same layer.

As described above, when a laminated core is formed by combining a plurality of electrical steel sheets in the same layer, it is possible to easily configure the coils (the primary coil 410, the secondary coil 420, the primary coils 1110_a_ and 1110_b_, and the secondary coils 1120_a_ and 1120_b_), which is preferable. However, it is not necessarily required to configure the laminated core as described above. For example, a laminated core may be configured by preparing a plurality of electrical steel sheets having the same size and shape as (one) electrical steel sheet having a squarish eight shape or square shape as the shape of the sheet surface and stacking the plurality of electrical steel sheets such that the contours are matched to each other. In this case, at the same position in the lamination direction of the electrical steel sheets, all of the regions of the plurality of legs and the plurality of yokes are configured by the same (one) electrical steel sheet.

Alternatively, when the outer shape of the sheet surface in the same layer of the laminated core is a squarish eight shape and the same layer is formed of a plurality of electrical steel sheets, the plurality of electrical steel sheets that form the same layer may include an electrical steel sheet having a different shape from the E-type electrical steel sheet and the I-type electrical steel sheet (for example, the same layer may be formed of a U-type electrical steel sheet and a T-type electrical steel sheet). Furthermore, when the outer shape of the sheet surface in the same layer of the laminated core is a square shape and the same layer is formed of a plurality of electrical steel sheets, the plurality of electrical steel sheets that form the same layer may include an electrical steel sheet having a different shape from the U-type electrical steel sheet and the I-type electrical steel sheet (for example, the same layer may be formed of two L-type electrical steel sheets). In addition, in a case where the same layer of the laminated core is formed of a plurality of electrical steel sheets, these plurality of electrical steel sheets may not be cut out from the same electrical steel strip. For example, a plurality of electrical steel sheets cut out from electrical steel strips (electrical steel strips having different manufacturing lots) that form different coils may form the same layer. In addition, in such a case, one electrical steel sheet that forms at least a part of each of the leg and the yoke that extend orthogonal to each other is the non-oriented electrical steel sheet described in the above-described section (electrical steel sheet used for laminated core), the other electrical steel sheets may not be the non-oriented electrical steel sheet described in the section (electrical steel sheet used for laminated core).

EXAMPLE

Next, an example will be described. In the present example, a laminated core made of an EI core using an electrical steel sheet described in the section (electrical steel sheet used for a laminated core) and a laminated core made of an EI core using a known non-oriented electrical steel sheet are compared. The thicknesses of the electrical steel sheets are all 0.25 mm. As the well-known non-oriented electrical steel sheet, a non-oriented electrical steel sheet having W10/400 of 12.8 W/kg was used. W10/400 is an iron loss when the magnetic flux density is 1.0T and the frequency is 400 Hz. In addition, the known non-oriented electrical steel sheet has the most excellent magnetic characteristics in the rolling direction, and the anisotropy of the magnetic characteristics is relatively small. In the following description, the known non-oriented electrical steel sheet will be referred to as material A as necessary. In addition, the electrical steel sheet described in the section (electrical steel sheet used for the laminated core), and the electrical steel sheet used for the laminated core of the present example is referred to as a material B as necessary.

Figure 12:
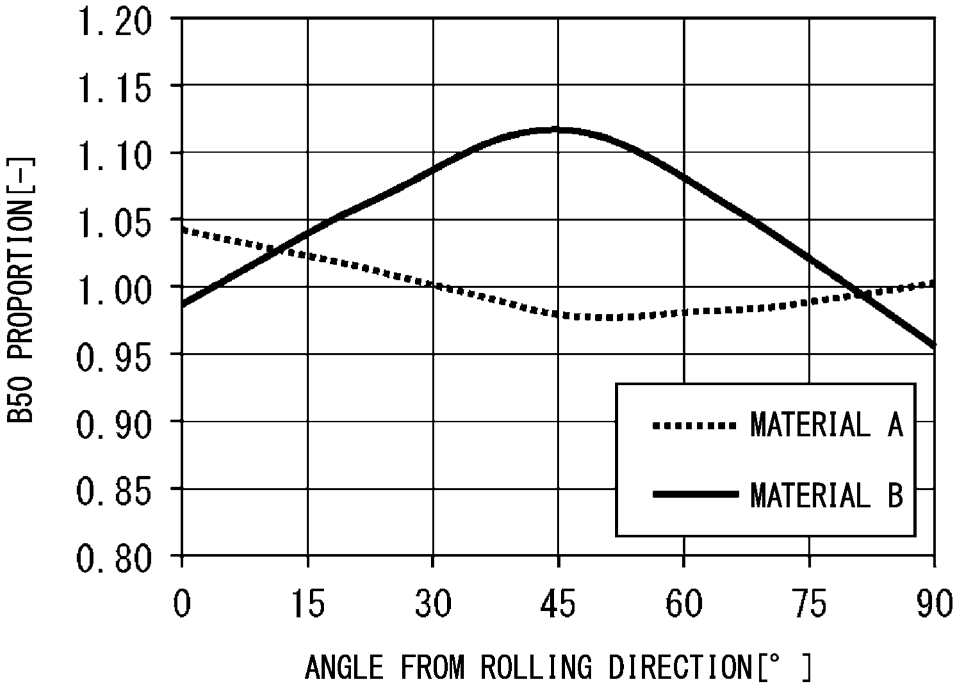
FIG. 12 is a view showing an example of a relationship between B50 proportions and angles from a rolling direction.
Figure 13:
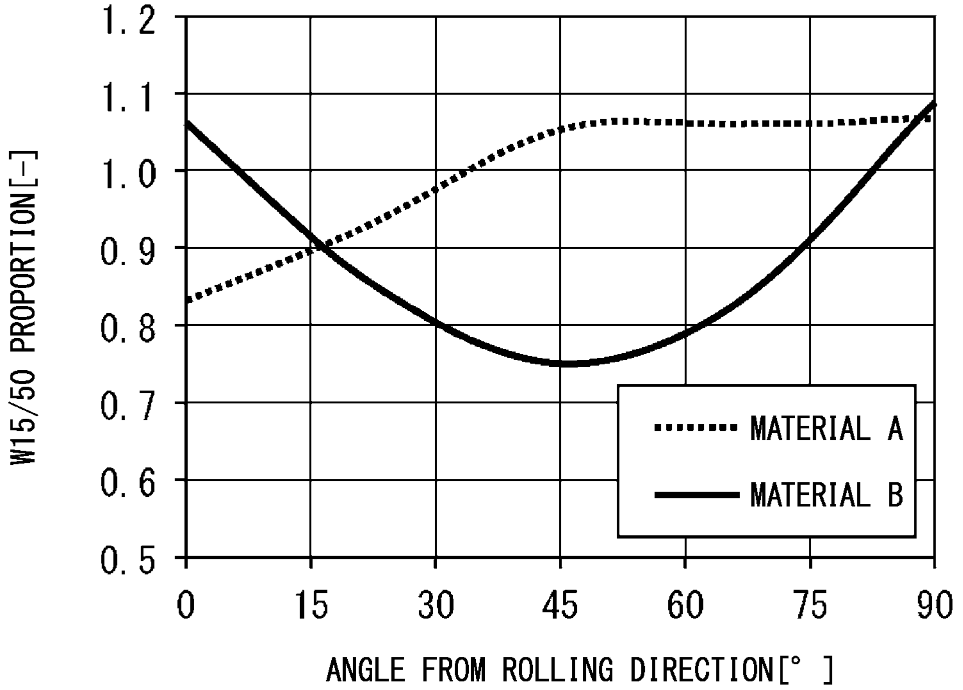
FIG. 13 is a view showing an example of a relationship between W15/50 proportions and the angles from the rolling direction.

FIG. 12 is a view showing an example of a relationship between B50 proportions and angles from a rolling direction. FIG. 13 is a view showing an example of a relationship between W15/50 proportions and the angles from the rolling direction. Here, B50 is a magnetic flux density when excited with a magnetic field strength of 5000 A/m, and W15/50 is an iron loss when the magnetic flux density is 1.5 T and the frequency is 50 Hz. Here, the magnetic flux density and the iron loss were measured by the method described in JIS C 2556: 2015.

In addition, FIG. 12 and FIG. 13 show normalized values of measurement values (magnetic flux densities or iron losses) at each angle from the rolling direction of each material. In normalization, the average value at each angle from the rolling direction of a material A was regarded as 1.000. As the average value at each angle from the rolling direction of the material A, the average value of the measurement values at eight angles of 0°, 22.5°, 45°, 67.5°, 90°, 112.5°, 135°, and 157.5° was used. As described above, the values on the vertical axis of FIG. 12 and FIG. 13 are relative values (dimensionless quantities).

As shown in FIG. 12, in the material B, the B50 proportion is the largest when the angle from the rolling direction is 45°, and the B50 proportion becomes smaller as the angle from the rolling direction approaches 0° and 90°.

On the other hand, in the material A, the B50 proportion becomes small at the angles from the rolling direction of near 45° to 90°.

As shown in FIG. 13, in the material B, the W15/50 proportion is the smallest when the angle from the rolling direction is 45°, and the W15/50 proportion becomes larger as the angle from the rolling direction approaches 0° and 90°.

On the other hand, in the material A, the W15/50 proportion is the smallest when the angle from the rolling direction is 0° and becomes larger when the angle from the rolling direction is at near 45° to 90°.

As described above, in the material B, the magnetic characteristics are most excellent in a direction (direction of easy magnetization) at an angle from the rolling direction of 45°. On the other hand, the magnetic characteristics are poorest in directions at angles from the rolling direction of 0° and 90° (the rolling direction and the direction orthogonal to the rolling direction).

The magnetic characteristics in four regions (that is, a region of 0° to 22.5°, a region of 22.5° to 45°, a region of 45° to 67.5°, and a region of 67.5° to 90°) from the rolling direction to a direction in which the smaller angle of the angles with respect to the rolling direction is 90° have, theoretically, a symmetrical relationship.

Regarding the E-type electrical steel sheet of the material A, the longitudinal direction of the three legs that are configured by the E-type electrical steel sheet were made to coincide with the rolling direction. Regarding the I-type electrical steel sheet of the material A, the longitudinal direction of the yokes that are configured by the I-type electrical steel sheet were made to coincide with the rolling direction.

Regarding the E-type electrical steel sheet of the material B, as described in the first embodiment, two directions of the longitudinal direction of the three legs that are configured by the E-type electrical steel sheet and the longitudinal direction of the yokes that are configured by the E-type electrical steel sheet were made to coincide with any of the two directions of easy magnetization. Regarding the I-type electrical steel sheet of the material B as well, as described in the first embodiment, the longitudinal direction of the yokes that are configured by the I-type electrical steel sheet is made to coincide with any of the two directions of easy magnetization.

The E-type and I-type electrical steel sheets of the material A and the E-type and I-type electrical steel sheets of the material B were also cut out from electrical steel strips by blanking with a mold. The shapes and sizes of the E-type electrical steel sheet of the material A and the E-type electrical steel sheet of the material B are the same. The shapes and sizes of the I-type electrical steel sheet of the material A and the I-type electrical steel sheet of the material B are the same.

Stress relief annealing was performed on a laminated core in which the E-type and I-type electrical steel sheets of the material A were stacked as described in the first embodiment, and the primary coil was disposed in the central leg of the laminated core. Similarly, stress relief annealing was performed on a laminated core in which the E-type and I-type electrical steel sheets of the material B were stacked as described in the first embodiment, and the primary coil was disposed in the central leg of the laminated core.

The number of the E-type and I-type electrical steel sheets that configure each laminated core is the same (the shape and size of each laminated core are the same). In addition, the primary coil that is disposed in each laminated core is the same coil.

An exciting current having the same frequency and effective value was made to flow through both ends of the primary coil disposed in each laminated core (that is, each laminated core was excited under the same exciting conditions), and in the central leg of each laminated core, the magnetic flux density was measured, and the iron loss was measured. In addition, the exciting current that flowed through the primary coil was measured, and the primary copper loss was derived.

As a result, the ratio of the primary copper loss in the case of using the laminated core of the material B to the primary copper loss in the case of using the laminated core of the material A was 0.92. In addition, the ratio of the iron loss of the laminated core of the material B to the iron loss of the laminated core of the material A was 0.81. As described above, in the present example, it was possible to reduce the primary copper loss 8% and the iron loss by 19% by using the material B compared with a case where the material A was used.

The embodiments of the present invention described above are all merely specific examples of carrying out the present invention, and the technical scope of the present invention should not be construed in a limited manner by these embodiments. That is, the present invention can be carried out in a variety of forms without departing from the technical idea or main features of the present invention.

INDUSTRIAL APPLICABILITY

According to the present invention, it is possible to improve the magnetic characteristics of laminated cores. Therefore, the present disclosure is highly industrially applicable.

BRIEF DESCRIPTION OF THE REFERENCE SYMBOLS

100, 500, 800: Laminated core

110, 510: E-type electrical steel sheet

120, 820: I-type electrical steel sheet

210*a* to 210*c*, 610*a* to 610*c*, 910*a*, and 910*b*: leg

220*a* to 220*c*, 620*a* to 620*c*, 920*a* and 920*b*: yoke

310, 710, 1010: rolling direction 320*a* and 320*b*, 720*a* and 720*b*, 1020*a* and 1020*b*: direction of easy magnetization

400, 1100: Electrical device

410, 1110*a*, and 1110*b*: Primary coil

420, 1120*a*, and 1120*b*: Secondary coil

The invention claimed is:

1. A laminated core comprising:

a plurality of electrical steel sheets laminated such that sheet surfaces face each other, wherein each of the plurality of electrical steel sheets includes a plurality of leg portions and a plurality of yoke portions that are disposed in a direction perpendicular to an extension direction of the leg portions as an extension direction such that a closed magnetic path is formed in the laminated core when the laminated core is excited, a lamination direction of the electrical steel sheet that configures the plurality of leg portions and a lamination direction of the electrical steel sheet that configures the plurality of yoke portions are the same as each other, the electrical steel sheet has a chemical composition containing, by mass %, C: 0.0100% or less, Si: 1.50% to 4.00%, sol. Al: 0.0001% to 1.0%, S: 0.0100% or less, N: 0.0100% or less, one or more selected from the group consisting of Mn, Ni, Co, Pt, Pb, Cu, and Au: 2.50% to 5.00% in total, Sn: 0.000% to 0.400%,
Sb: 0.000% to 0.400%,
P: 0.000% to 0.400%, and
one or more selected from the group consisting of Mg, Ca, Sr, Ba, Ce, La, Nd, Pr, Zn, and Cd: 0.0000% to 0.0100% in total,
in which, when a Mn content (mass %) is indicated by [Mn], a Ni content (mass %) is indicated by [Ni], a Co content (mass %) is indicated by [Co], a Pt content (mass %) is indicated by [Pt], a Pb content (mass %) is indicated by [Pb], a Cu content (mass %) is indicated by [Cu], an Au content (mass %) is indicated by [Au], a Si content (mass %) is indicated by [Si], and a sol. Al content (mass %) is indicated by [sol. Al], Formula (A) below is satisfied, and
a remainder includes Fe and impurities,
when B50 in a rolling direction is indicated by B50L, B50 in a direction at an angle of 90° from the rolling direction is indicated by B50C, and, between B50 in two directions in which a smaller angle of angles with respect to the rolling direction is 45°, B50 in one direction is indicated by B50D1, and B50 in the other direction is indicated by B50D2, Formula (B) and Formula (C) below are satisfied, an X-ray random intensity ratio in {100}<011>is 5 or more and less than 30, and a sheet thickness is 0.50 mm or less,
the electrical steel sheet is disposed such that any direction of two directions in which magnetic characteristics of the electrical steel sheet are most excellent is along any of the extension direction of the leg portions and the extension direction of the yoke portions, and
the two directions in which the magnetic characteristics are most excellent are the two directions in which the smaller angle of the angles with respect to the rolling direction is 45°, $$([Mn]+[Ni]+[Co]+[Pt]+[Pb]+[Cu]+[Au])-([Si]+[sol.Al])>0\% \cdots \quad (A)$$

$$(B50D1+B50D2)/2>1.7T \cdots \quad (B)$$

$$(B50D1+B50D2)/2>(B50L+B50C)/2 \cdots \quad (C)$$

2. The laminated core according to claim 1,
wherein Formula (D) below is satisfied, $$(B50D1+B50D2)/2>1.1\times(B50L+B50C)/2 \cdots \quad (D)$$

3. The laminated core according to claim 1,
wherein Formula (E) below is satisfied, $$(B50D1+B50D2)/2>1.2\times(B50L+B50C)/2 \cdots \quad (E)$$

4. The laminated core according to claim 1,
wherein Formula (F) below is satisfied, $$(B50D1+B50D2)/2>1.8T \cdots \quad (F)$$

5. The laminated core according to claim 1,
wherein the laminated core is an EI core, an EE core, a UI core, or a UU core.

6. An electrical device comprising:
the laminated core according to claim 1; and
a coil that is disposed so as to surround the laminated core.

7. A laminated core comprising:
a plurality of electrical steel sheets laminated such that sheet surfaces face each other,
wherein each of the plurality of electrical steel sheets includes
a plurality of leg portions and
a plurality of yoke portions that are disposed in a direction perpendicular to an extension direction of the leg portions as an extension direction such that a closed magnetic path is formed in the laminated core when the laminated core is excited,
a lamination direction of the electrical steel sheet that configures the plurality of leg portions and a lamination direction of the electrical steel sheet that configures the plurality of yoke portions are the same as each other,
the electrical steel sheet has a chemical composition containing, by mass %,
C: 0.0100% or less,
Si: 1.50% to 4.00%,
sol. Al: 0.0001% to 1.0%,
S: 0.0100% or less,
N: 0.0100% or less,
one or more selected from Mn, Ni, Co, Pt, Pb, Cu, and Au: 2.50% to 5.00% in total,
Sn: 0.000% to 0.400%,
Sb: 0.000% to 0.400%,
P: 0.000% to 0.400%, and
one or more selected from Mg, Ca, Sr, Ba, Ce, La, Nd, Pr, Zn, and Cd: 0.0000% to 0.0100% in total,
in which, when a Mn content (mass %) is indicated by [Mn], a Ni content (mass %) is indicated by [Ni], a Co content (mass %) is indicated by [Co], a Pt content (mass %) is indicated by [Pt], a Pb content (mass %) is indicated by [Pb], a Cu content (mass %) is indicated by [Cu], an Au content (mass %) is indicated by [Au], a Si content (mass %) is indicated by [Si], and a sol. Al content (mass %) is indicated by [sol. Al], Formula (A) below is satisfied, and
a remainder includes Fe and impurities,
when B50 in a rolling direction is indicated by B50L, B50 in a direction at an angle of 90° from the rolling direction is indicated by B50C, and, between B50 in two directions in which a smaller angle of angles with respect to the rolling direction is 45°, B50 in one direction is indicated by B50D1, and B50 in the other direction is indicated by B50D2, Formula (B) and Formula (C) below are satisfied, an X-ray random intensity ratio in {100}<011>is 5 or more and less than 30, and a sheet thickness is 0.50 mm or less,
the electrical steel sheet is disposed such that any direction of two directions in which magnetic characteristics of the electrical steel sheet are most excellent is along any of the extension direction of the leg portions and the extension direction of the yoke portions, and
the two directions in which the magnetic characteristics are most excellent are the two directions in which the smaller angle of the angles with respect to the rolling direction is 45°, $$([Mn]+[Ni]+[Co]+[Pt]+[Pb]+[Cu]+[Au])-([Si]+[sol.Al])>0\% \cdots \quad (A)$$

$$(B50D1+B50D2)/2>1.7T \cdots \quad (B)$$

$$(B50D1+B50D2)/2>(B50L+B50C)/2 \cdots \quad (C)$$

* * * * *